United States Patent
Horiuchi et al.

[11] Patent Number: 6,160,649
[45] Date of Patent: Dec. 12, 2000

[54] OPTICAL POWER MEASURING SYSTEM TERMINAL STATION AND REPEATER THEREFOR

[75] Inventors: Yukio Horiuchi; Shu Yamamoto; Shigeyuki Akiba, all of Tokyo, Japan

[73] Assignee: Kokusai Denshin Denwa Kabushiki Kaisha, Tokyo, Japan

[21] Appl. No.: 09/136,720

[22] Filed: Aug. 19, 1998

[30] Foreign Application Priority Data

Aug. 20, 1997 [JP] Japan ..................................... 9-223225

[51] Int. Cl.[7] ................................................. H04B 10/08
[52] U.S. Cl. ......................... 359/110; 359/124; 359/177; 359/158
[58] Field of Search ..................... 359/110, 177, 359/124, 158

[56] References Cited

U.S. PATENT DOCUMENTS 5,654,816 8/1997 Fishman .................................. 359/177
5,923,453 7/1999 Yoneyama ............................... 359/177

*Primary Examiner*—Leslie Pascal
*Assistant Examiner*—Hanh Phan

*Attorney, Agent, or Firm*—Christie, Parker & Hale, LLP

[57] ABSTRACT

An oscillator oscillates at a predetermined reference frequency, and a reference signal light sender generates light (reference signal light) of a specific wavelength deeply modulated by output from the oscillator. A frequency divider frequency-divides the output from the oscillator into a certain number, and outputs a tone signal of a predetermined measurement frequency. Output from the frequency divider is applied to selected one of a plurality of optical transmission signal senders via one of a plurality of switches, and is used to slightly intensity-modulate a corresponding optical transmission signal. An optical divider in an optical repeater outputs most of output light from an optical amplifier onto an optical fiber transmission line toward a terminal station, and applies small amounts of the light to a measuring circuit. The measuring circuit synchronously detects the measurement frequency component in the received light using the reference frequency obtained from the reference signal light of the specific wavelength. A modulator slightly varies the amplification gain of the other optical amplifier that amplifies the signal light travelling on the other optical fiber transmission line in response to results of measurement by the measuring circuit.

36 Claims, 12 Drawing Sheets

OPTICAL POWER MEASURING SYSTEM TERMINAL STATION AND REPEATER THEREFOR

FIELD OF THE INVENTION

This invention relates to an optical power measuring system, a terminal station and a repeater therefor, in an optical transmission system. More specifically, the invention relates to an optical power measuring system for measuring optical powers of individual wavelength components in wavelength division multiplexed light in a wavelength division multiplexing optical transmission system, and a terminal station and a repeater therefor.

BACKGROUND OF THE INVENTION

In the field of optical fiber communication, wavelength division multiplexing transmission systems are remarked as being available for a drastic increase in transmission capacity. In optical amplifying repeating transmission systems configured to amplify and repeat optical signals to transmit them over a long distance, optical band equalizing technologies are indispensable to flatten wavelength amplifying characteristics of optical amplifying repeater. Wavelength amplifying characteristics vary with the state of pumping of the optical amplifier. As a result, flattened amplifying characteristics may vary and may become non-flat relative to the wavelength due to a trouble in the pumping light source, for example. It is therefore important for maintenance and operation of an optical transmission system to monitor the output of the optical amplifier to know power of each signal wavelength component in the wavelength division multiplexed light.

An optical spectrum analyzer is usually used as a device for measuring optical power of each signal wavelength component in a wavelength division multiplexed optical signal. However, in optical repeaters which are used in locations very difficult to install them, such as in optical submarine cables, and are required to be miniaturized and highly reliable, it is almost impossible to use conventional optical spectrum analyzers.

To overcome the problem, a structure has been proposed that detects optical power by superposing a tone signal of a low frequency (approximately several 10 kHz, herein called the measurement frequency because it is the direct subject of measurement) onto each signal wavelength component in a wavelength division multiplexed optical signal, transmitting the superposed optical signals into an optical fiber line, and extracting the tone frequency component from the signals in each optical repeater. FIG. 13 is a block diagram of a general construction of the proposal.

Terminal stations 110, 112 respectively have optical sending equipment 110S, 112S, and optical receiving equipment 110R, 112R. The terminal stations 110, 112 are connected to each other by an optical repeating transmission line 114 including a pair of optical fiber transmission lines 114a, 114b. An optical signal output from the optical sending equipment 110S in the terminal station 110 travels through the optical fiber transmission line 114a and enters into the optical receiving equipment 112R in the terminal station 112. An optical signal output from the optical sending equipment 112S in the terminal station 112 travels through the optical fiber transmission line 114b and enters into the optical receiving equipment 110R in the terminal station 110. Typically, a plurality of optical repeaters 116 are provided along the optical repeating transmission line 114. FIG. 13, however, illustrates only one optical repeater 116 for simplicity.

The optical sending equipment 110S includes optical transmission signal senders 118-1 through 118-n which convert digital data #1 through #n into optical signals with different frequencies λ1 through λn, respectively and output them. The optical signals with frequencies λ1 through λn output from the optical transmission signal senders 118-1 through 118-n are wavelength-multiplexed by a wavelength multiplexer 120, and sent out onto the optical fiber transmission line 114a.

In order to measure the optical power of each wavelength light, the optical sending equipment 110S further includes an oscillator 122 which oscillates at a predetermined low frequency fs (measurement frequency), and a tone signal of the measurement frequency fs output from the oscillator 122 is applied to the optical transmission signal senders 118-1 through 118-n via switches 124-1 through 124-n. When one of the switches 124-1 through 124-n is closed, the tone signal output from the oscillator 122 is delivered to corresponding one of the optical transmission signal senders 118-1 through 118-n. One of the optical transmission signal senders 118-1 to 118-n supplied with the tone signal output from the oscillator 122 slightly modulates the optical transmission signal in intensity with the tone signal (frequency fs) output from the oscillator 122. For example, the injection current of the light source of each optical transmission signal sender 118-1 to 118-n is slightly amplitude-modulated with the tone signal output from the oscillator 122. The rate of the amplitude modulation is usually within 5% not to affect the transmission characteristics of the optical transmission signal. FIG. 14 shows a time waveform of an optical transmission signal intensity-modulated with a sinusoidal wave output from the oscillator 122.

Also the optical sending equipment 112S in the terminal station 112 have the same construction and operates in the same manner as the optical sending equipment 110S in the terminal station 110.

In the optical repeater 116, optical amplifiers 130a, 130b optically amplify optical signals (wavelength division multiplexed optical signals with wavelengths λ1 through λn) introduced from the optical fibers transmission lines 114a, 114b. Dividers 132a, 132b respectively output most of the optical outputs of the optical amplifiers 130a, 130b onto the optical fiber transmission lines 114a, 114b toward the terminal stations 112, 110 (or a subsequent optical repeater) and apply small amounts of them to measuring circuits 134a, 134b. The measuring circuits 134a, 134b, which will be explained later in greater detail, extract optical intensity components (that is, optical output component of an optical transmission signal sender 118-i (i=1~n) corresponding to a closed switch 124-i) variable with oscillation frequency fs of the oscillator 122 in the optical sending equipment 110S, and measure their optical intensity. Modulators 136a, 136b slightly modulate amplification gains of the optical amplifiers 130b, 130a in accordance with the digital data (or their coded data) resulting from measurement by the measuring circuits 134a, 134b in order to deliver the results of measurement by the measuring circuits 134a, 134b.

In this manner, the optical signal from the terminal station 112 toward the terminal station 110 results in being intensity-modulated in response to the measured optical power of light with a predetermined wavelength in the wavelength division multiplexed light output from the terminal station 110, and the intensity-modulated optical signal is sent out onto the optical fiber transmission line 114b via the divider 132b and enters into the optical receiving equipment 110R in the terminal station 110. Similarly, the optical signal from the terminal station 110 toward the terminal station 112 is intensity-modulated in response to the measured optical power of light with a predetermined wavelength in the wavelength division multiplexed light output from the terminal station 112, and the intensity-modulated optical signal is sent out onto the optical fiber transmission line 114a via the divider 132a and enters into the optical receiving equipment 112R in the terminal station 112.

In the optical receiving equipment 112R in the terminal station 112, the optical signal introduced from the optical fiber transmission line 114a is divided by a divider 140 into a part to be processed as a received signal light and a part to be processes as power measurement data. The divisional light to be processed as the received signal light is applied to a wavelength demultiplexer 142. The wavelength demultiplexer 142 demultiplexes the light from the divider 140 into different wavelengths λ1 through λn, and applies them to optical transmission signal receivers 144-1 through 144-n. The optical transmission signal receivers 144-1 through 144-n reproduce data #1 through #n from optical signals with wavelengths λ1 through λn from the wavelength demultiplexer 142, and output them. Thus, the data #1 through #n are transmitted from the terminal station 110 to the terminal station 112. Also in the optical receiving equipment 110R in the terminal station 110, the same processing is executed.

The light divided by the divider 140 to be processed as the power measurement data is introduced into a photodetector 146 and converted into an electric signal. A data reproducing circuit 148 extracts and reproduces power measurement data from the electric signal output from the photodetector 146. A display/record device 150 displays the power measurement data information from the data reproducing circuit 148 on a monitor screen and/or records it on a recording medium. An administrator in the terminal station 112 for managing the optical transmission system looks at the power measurement data information, and adjusts the optical output power of each transmission signal sender in the optical sending equipment 112S.

The same processing as that of the optical receiving equipment 112R in the terminal station 112 is executed also in the optical receiving equipment 110R in the terminal station 110. An administrator in the terminal station 110 for managing the optical transmission system looks at the optical power information of each wavelength output from a display/record device in the optical receiving equipment 110R, similar to the display/record device 150, and adjusts the optical output power of each optical transmission signal sender 118-1 through 118-n in the optical sending equipment 110S.

FIG. 15 is a block diagram generally showing the construction of the measuring circuit 134a. The measuring circuit 134b also has the same construction as the measuring circuit 134a. A photodetector 152 converts light (wavelength division multiplexed light with wavelengths λ1 to λn) from the divider 132a into an electric signal, and amplified and outputs it. The photodetector 152 may be of a low-speed type sufficient for extracting the oscillation frequency fs of the oscillator 122. In the case where NRZ codes are used as the coding system of the wavelength division multiplexed optical signal, and all coding rates are equal, a strong power spectral component accumulating optical signal spectral distributions of respective wavelengths as shown in FIG. 16 appears at the output of the photodetector 152. The output of the photodetector 152 is applied to a band pass filter 154 whose central frequency in the pass band is the tone signal frequency fs, and the frequency fs component is extracted from the output of the photodetector 152. The spectral distribution of an output from the band pass filter 154 is shown in FIG. 17. Here is shown that the fs frequency component slightly projects from the spectral component of the transmission signal within the pass band of the band pass filter 154.

A detector 156 detects the envelope of the frequency fs component from the output of the band pass filter 154. It is known that an optical power Ps and the level S of a tone signal with the depth of modulation factor m have the following relation.

$$S = a(mRPs)^2 \qquad (1)$$

where a is a coefficient indicating the loss from the optical amplifier 130a to the measuring circuit 134a and the gain of the photodetector 152, and R is the sensitivity to light of the photodetector 152. The coefficient a is calculated upon fabrication of the repeater 116 from the power Ps of the optical signal output from the divider 132a, after superposition of the tone signal, and the actual value of the tone signal level S measured by the measuring circuit 134a. Since the coefficient a, modulation factor m and light sensitivity R are already known, the optical power Ps can be known by measuring the tone signal level S. Since this conversion is typically made in the terminal stations 110, 112, output of the detector 156 is applied to the modulator 136a as an output of the measuring circuit 134a.

In this manner, by applying the tone signal output from the oscillator 122 to the optical transmission signal senders 118-1 through 118-n in sequence, the optical power of the signal light with respective wavelengths can be measured in the actually transmitted mode of the wavelength division multiplexed optical signal.

However, in conventional art, as the number of wavelengths to be wavelength-division-multiplexed increases, the power spectral density of the transmission signal increases at the output of the photodetector 152, and it causes deterioration of the S/N ratio at the output of the band pass filter 154. It results in serious degradation of the power measurement accuracy, or finally disables detection of the tone component, which means that the measurement of the optical power of each wavelength signal becomes impossible.

Although the S/N ratio at the output of the band pass filter 154 can be improved by increasing the modulation factor of tone, excessively deep modulation is undesirable because it invites deterioration of the transmission characteristics of the optical transmission signal.

The S/N ratio can be improved also by narrowing the pass band of the band pass filter 154. However, in the present state of art, in addition to the fact that the selection degree Q is up to about 1000, the use of too narrow pass band not only requires more strict control of the oscillation frequency fs of the oscillator 122 but also needs the use of a band pass filter 154 with a highly stable center frequency. These are the factors increasing the cost.

SUMMARY OF THE INVENTION

It is therefore an object of the invention to provide an optical power measuring system which makes it possible to measure optical power of each wavelength light in a wavelength division multiplexing optical transmission system with no adverse affection to transmission characteristics of optical transmission signals, and terminal station and repeater therefor.

Another object of the invention is to provide an optical power measuring system promising precise measurement of power of each wavelength light in a wavelength division multiplexing optical transmission system, and terminal station and repeater therefor.

Still another object of the invention is to provide an optical power measuring system enabling measurement of power of each wavelength light to a lower level in a wavelength division multiplexing optical transmission system, and terminal station and repeater therefor.

The invention is configured to send out onto an optical repeating transmission line selected one of a plurality of optical transmission signals having different wavelengths 1 through λn after slightly intensity-modulating it by a measurement frequency fs and to send out onto the optical repeating transmission line also a reference signal light having the wavelength λr different from the wavelengths λ1 through λn of the optical transmission signals, which is intensity-modulated by a reference signal carrying a frequency and phase information of the measurement frequency fs.

The repeater on the optical repeating transmission line includes measuring means for reproducing the reference signal and a to-be-measured signal with the measurement frequency fs from input light and for measuring optical power of the to-be-measured signal in response to the frequency and phase information of the measurement frequency fs obtained from the reference signal, and a signal transmitter for transmitting the result of measurement by the measuring means toward a predetermined station. The signal transmitter may send out the result of measurement, for example, by superposing it on an optical signal toward the sender of the optical transmission signal.

The reference signal may be a tone signal of the reference frequency fr corresponding to N times the measurement frequency fs, or a signal made by modulating a tone signal with a higher reference frequency fr than the measurement frequency fs by the measurement frequency fs according to a predetermined modulation method.

Thus the to-be-measured signal can be detected with a high S/N ratio, and its optical power can be measured precisely and over a wider range of power including lower levels.

BRIEF DESCRIPTION OF THE DRAWINGS

FIG. 4 is a spectral waveform diagram of light sent out from an optical sending equipment 10S onto an optical fiber transmission line 14a;

FIG. 5 is a block diagram schematically showing a construction of a measuring circuit 34a;

FIG. 6 is a block diagram schematically showing another circuit construction of the measuring circuit 34a;

FIG. 11 is a block diagram schematically showing a construction of a measuring circuit 234a;

FIG. 12 is a block diagram schematically showing another circuit construction of the measuring circuit 234a;

FIG. 15 is a block diagram schematically showing the construction of a measuring circuit 134a;

DESCRIPTION OF THE PREFERRED EMBODIMENTS

Some embodiments of the invention are explained below in detail with reference to the drawings.

Figure 1:
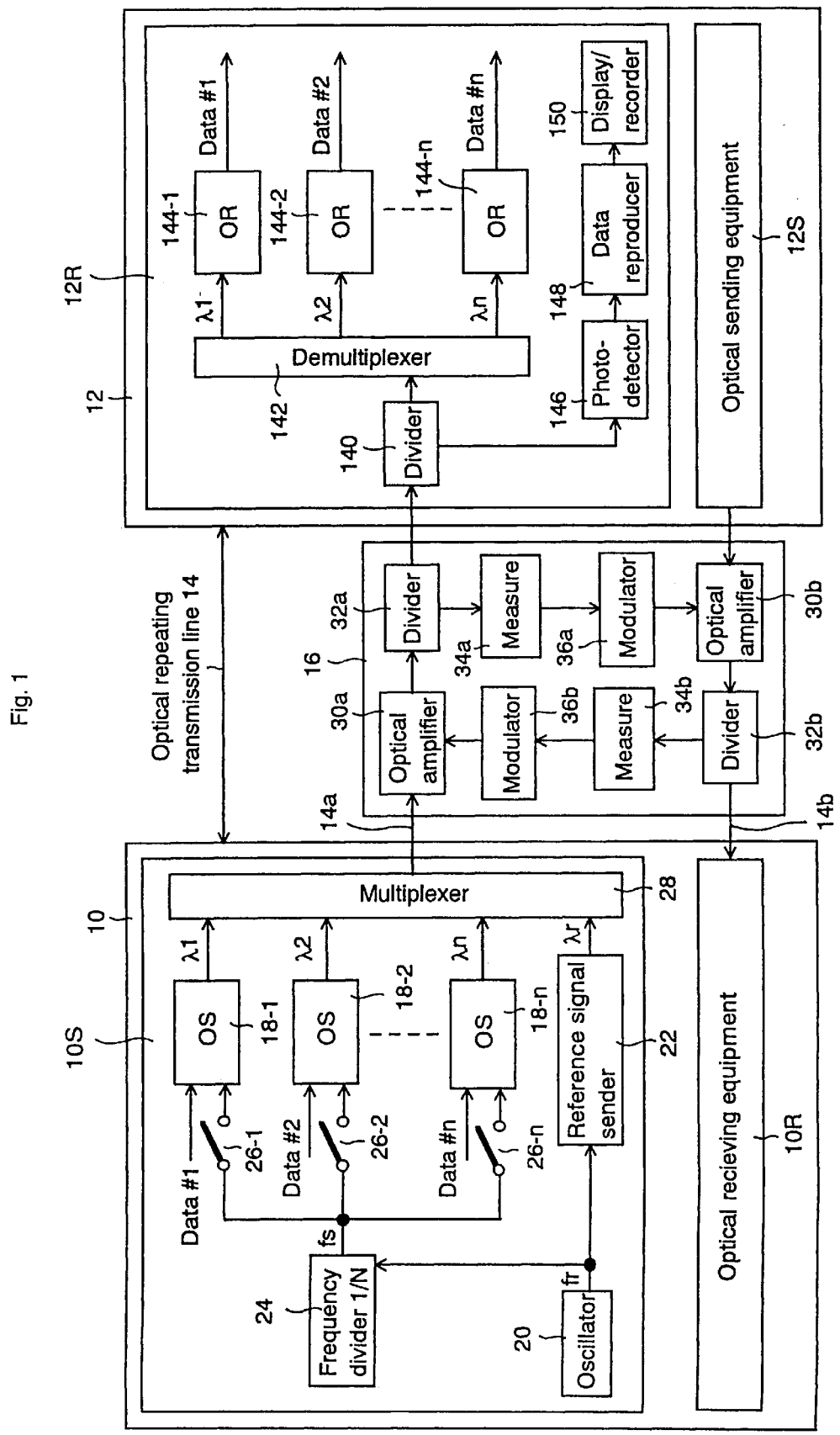
FIG. 1 is a block diagram showing a general construction according to an embodiment of the invention.

FIG. 1 is a block diagram showing a general construction of an embodiment of the invention. Terminal stations 10, 12 have optical sending equipment 10S, 12S and optical receiving equipment 10R, 12R, respectively. The terminal stations 10, 12 are connected by an optical repeating transmission line 14 containing a pair of optical fiber transmission lines 14a, 14b. An optical signal output from the sending equipment 10S in the terminal station 10 travels through the optical fiber transmission line 14a and enters into the optical receiving equipment 12R in the terminal station 12. An optical signal output from the optical sending equipment 12S in the terminal station 12 travels through the optical fiber transmission line 14b and enters into the optical receiving equipment 10R in the terminal station 10. Typically, a plurality of optical repeaters 16 are provided on the optical repeating transmission line 14. FIG. 1, however, illustrates only one optical repeater 16 for simplicity.

Similarly to the conventional system, the optical sending equipment 10S includes optical transmission signal senders 18-1 through 18-n which respectively convert digital data #1 through #n into signal light with different wavelengths λ1 through λn and send them out. The optical sending equipment 10S used in the embodiment further includes an oscillator 20 which oscillates at a predetermined low reference frequency fr, a reference signal light sender 22 which generates light with a wavelength λr (reference signal light) deeply intensity-modulated by a tone signal with the reference frequency fr output from the oscillator 20, a frequency divider 24 which divides the output from the oscillator 20 into 1/N and outputs a tone signal with the measurement frequency fs (=fr/N), and switches 26-1 through 26-n for selectively supplying the tone signal of the measurement frequency fs output from the frequency divider 24 to one of optical transmission signal senders 18-1 through 18-n.

Figure 2:
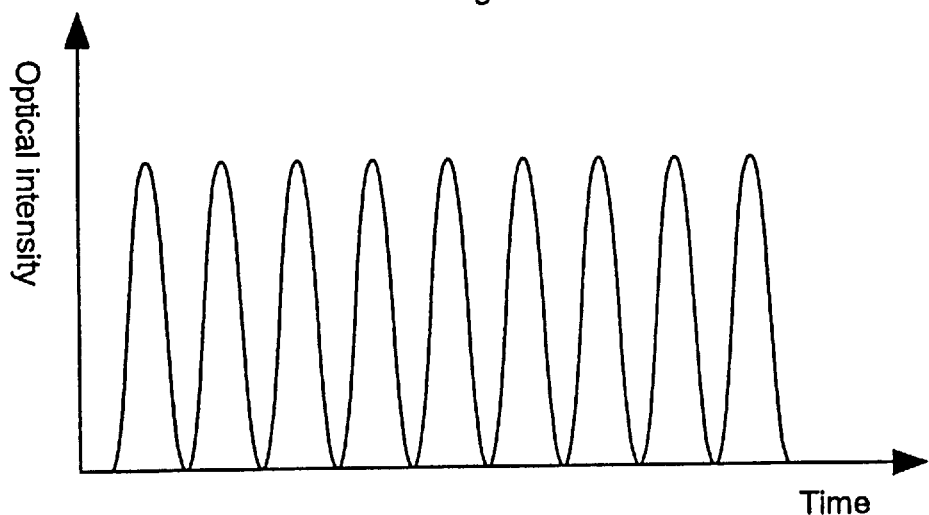
FIG. 2 is a time waveform diagram of a reference signal light output from a reference signal light generator 22.
Figure 3:
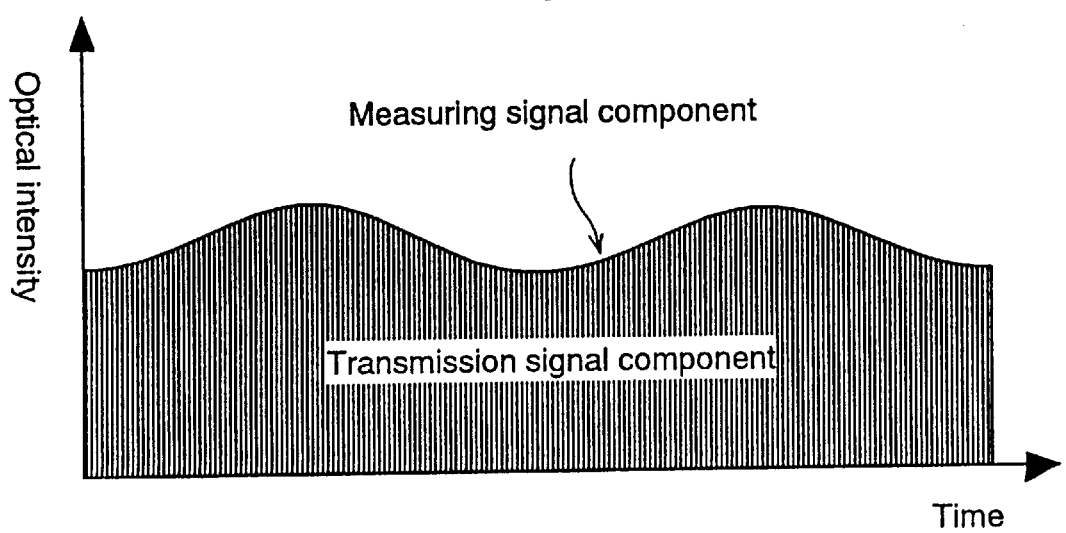
FIG. 3 is a time waveform diagram of an optical transmission signal after intensity-modulation by a tone signal with a measurement frequency fs.

The reference signal light sender 22 outputs a reference signal light deeply intensity-modulated by the reference frequency fr as shown in FIG. 2. The frequency divider 24 divides the tone signal of the reference frequency fr output from the oscillator 20 into 1/N to generate a tone signal of the measurement frequency fs (=fr/N). Switches 26-1 through 26-n are so configured that one of them is closed to pass an output from the frequency divider 24 to one of optical transmission signal senders 18-1 though 18-n, like the switches 124-1 through 124-n in the conventional system. One of the optical transmission signal senders 18-1 through 18-n supplied with the tone signal of the measurement frequency fs slightly intensity-modulates the optical transmission signal by the tone signal of the measurement frequency fs. The intensity modulation factor is set to a value low enough to prevent any adverse affection to the transmission characteristics of the optical transmission signal. FIG. 3 shows a time waveform of the optical transmission signal after intensity modulation by the tone signal of the measurement frequency fs.

Figure 4:
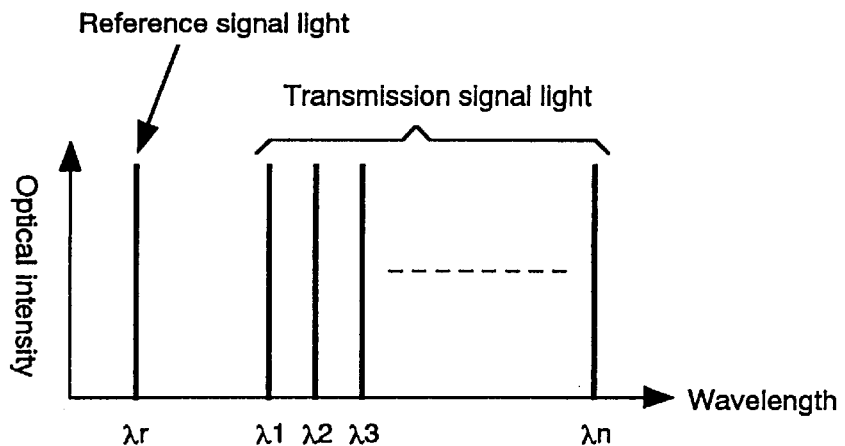

A wavelength multiplexer 28 wavelength-multiplexes the signal lights of wavelengths $\lambda 1$ through $\lambda n$ output from respective optical transmission signal senders 18-1 through 18-n and the reference signal light of the wavelength $\lambda r$ output from the reference signal light sender 22, and sends thus wavelength-multiplexed light out onto the optical fiber transmission line 14a. More specifically, in the present embodiment, light of the wavelength $\lambda r$ (reference signal light) deeply intensity-modulated by the reference frequency fr equal to N times the measurement frequency of the tone signal used to intensity-modulate any one of optical transmission signals is wavelength-multiplexed onto the signal lights of wavelengths $\lambda 1$ to $\lambda n$, and sent out onto the optical repeating transmission line 14. FIG. 4 shows a spectral waveform of light sent out onto the optical fiber transmission line 14a, putting optical intensity on the longitudinal axis and wavelength on the vertical axis. Output light from the reference signal light sender 22 is used as the reference for extracting a wavelength component intensity-modulated by the frequency fs as explained later in greater detail. In this sense, it is named the reference signal light in the present embodiment.

Also the optical sending equipment 12S in the terminal station 12 has the same construction and operates in the same manner as the optical sending equipment 10S in the terminal station 10.

In the optical repeater 16, optical amplifiers 30a, 30b, respectively, optically amplify optical signals from the optical fiber transmission lines 14a, 14b (wavelength division multiplexed optical signal containing signal lights of wavelengths $\lambda 1$ to $\lambda n$ and the reference signal light of the wavelength $\lambda r$). Dividers 32a, 32b respectively output most of output light from the optical amplifiers 30a, 30b to the terminal stations 12, 10 (or to a subsequent optical repeater) and a small divisional part of it to the measuring circuits 34a, 34b. The measuring circuits 34a and 34b, unlike the measuring circuits 134a and 134b used in the conventional system, synchronously detect the component with the measurement frequency fs from intensity fluctuation of the received light by using the reference frequency fr obtained from the reference signal light with the wavelength $\lambda r$. The measuring circuits 34a, 34b are explained later in greater detail. As a result, in the optical sending equipment 10S, the output light component from the optical transmission signal sender 18-i (i=1~n) corresponding to the currently closed switch 26-i can be extracted with a high S/N ratio, and its optical intensity (specifically, amplitude of the intensity component variable with the measurement frequency fs) can be measured. Modulators 36a and 36b, similarly to the modulators 136a and 136b used in the conventional system, slightly modulate the amplification gains of the optical amplifiers 30b and 30a in response to the digital data (or its coded data) resulting from measurement by the measuring circuits 34a and 34b.

Results of optical power measurement of individual wavelengths are transmitted to the terminal stations 10, 12, in the same manner as the conventional system. That is, the optical signal from the terminal station 12 toward the terminal station 10 is intensity-modulated following to the result of optical power measurement of predetermined wavelength light in the wavelength division multiplexed light output from he terminal station 10, and the intensity-modulated optical signal is sent out onto the optical fiber transmission line 14b through the divider 32b and enters into the optical receiving equipment 10R in the terminal station 10. Similarly, an optical signal from the terminal station 10 to the terminal station 12 is intensity-modulated following to the result of optical power measurement of predetermined wavelength light in the wavelength division multiplexed light output from the terminal station 12, and the intensity-modulated optical signal is sent out onto the optical fiber transmission line 14a through the divider 32a and enters into the optical receiving equipment 12R in the terminal station 12.

The construction of the optical receiving equipment 12R in the terminal station 12 may be identical to that of the optical receiving equipment 112R in the terminal station 112 of the conventional system. For this reason, the same elements as those in the optical receiving equipment 112R are labeled with the same reference numerals. That is, in the optical receiving equipment 12R, the optical transmission signal receivers 144-1 through 144-n receive the signal light from the optical transmission signal senders 18-1 through 18-n, and outputs data #1 through #n, whereas power measurement data is processed (converted into a transmission optical signal intensity, for example) by the photodetector 146 and the data reproducing circuit 148, and displayed on a monitor screen and/or recorded on a recording medium by the display/record device 150. The same processing is executed also in the optical receiving equipment 10R in the terminal station 10.

Figure 5:
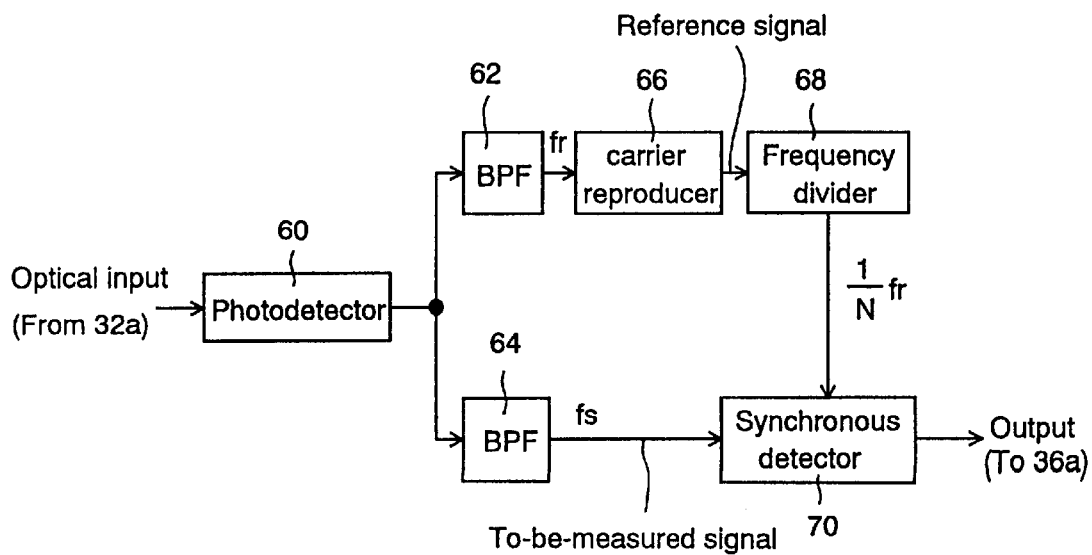

FIG. 5 is a block diagram schematically showing the construction of the measuring circuit 34a. Also the measuring circuit 34b has the same construction as that of the measuring circuit 34a. A photodetector 60 converts light from the divider 32a (wavelength division multiplexed light containing wavelengths $\lambda 1$ to $\lambda n$ and $\lambda r$) into an electric signal and outputs it in an amplified form into a predetermined level. Output of the photodetector 60 is applied to a band pass filter of center frequency fr and to a band pass filter 64 of center frequency fs. The band pass filter 62 extracts the component of the reference frequency fr, and the band pass filter 64 extracts the component of the measurement frequency fs.

Output from the band pass filter 62 is applied to the carrier reproducing circuit 66. The carrier reproducing circuit 66 reproduces the tone signal of the reference frequency fr, namely, the tone signal with the reference frequency fr (reference signal) output from the oscillator 20 of the optical sending equipment 10S in the terminal station 10, from the output of the band pass filter 62. The carrier reproducing circuit 66 is composed of a phase locked loop (PLL) circuit and a limiter amplifier, for example. The frequency divider 68 divides the output of the carrier reproducing circuit 66 into 1/N, and generates a tone signal with the measurement frequency fs.

The measurement frequency fs component (to-be-measured signal) extracted by the band pass filter 64 and the tone signal with the frequency fs output from the frequency divider 68 are applied to a synchronous detector 70. The synchronous detector 70 synchronously detects the component of the measurement frequency fs from the output of the band pass filter 64 by using the tone signal with the frequency fs output from the frequency divider 68. The synchronous detector 70 outputs a DC signal of a level corresponding to the amplitude of the measurement frequency fs component contained in the output of the band pass filter 64. Output from the synchronous detector 70 is applied to the modulator 36a as an output of the measuring circuit 34a.

As explained before, the level of the tone signal with the measurement frequency fs superposed on the transmission signal light has the one-to-one relation with the power of the transmission signal light, and the optical power of the transmission signal light can be calculated from the level of the measured tone signal. The conversion may be done either in the measuring circuits 34a and 34b or modulators 36a and 36b, namely in the repeater 16, or in the optical receiving equipment 10R and 12R in the terminal stations 10 and 12. However, since it is desirable to simplify the construction of the repeater 16, it is preferable to perform the conversion in the terminal stations 10 and 12. The embodiment shown here is configured to transmit to the terminal stations 10, 12 the measurement result of the level of the tone signal with the measurement frequency fs superposed on the transmission signal light as information indicating measurement data of the optical power of the wavelength light.

Since the output of synchronous detection is a DC, the transmission signal spectral component can be removed by passing it through a low pass filter whose cut-off frequency is several Hz, and the S/N ratio can be improved significantly.

In the measuring circuit shown in FIG. 5, although the reference signal light is deeply modulated, it becomes difficult to maintain a good S/N ratio in the carrier reproducing circuit 66 as the number of multiplexed wavelengths increases in the transmission signal, and it may result in producing a jitter in the reproduced reference signal. Such undesirable matters can be overcome by reproducing the reference frequency fr only from the reference signal light component, namely, by extracting the reference signal light component in the optical stage, to minimize the jitter.

Figure 6:
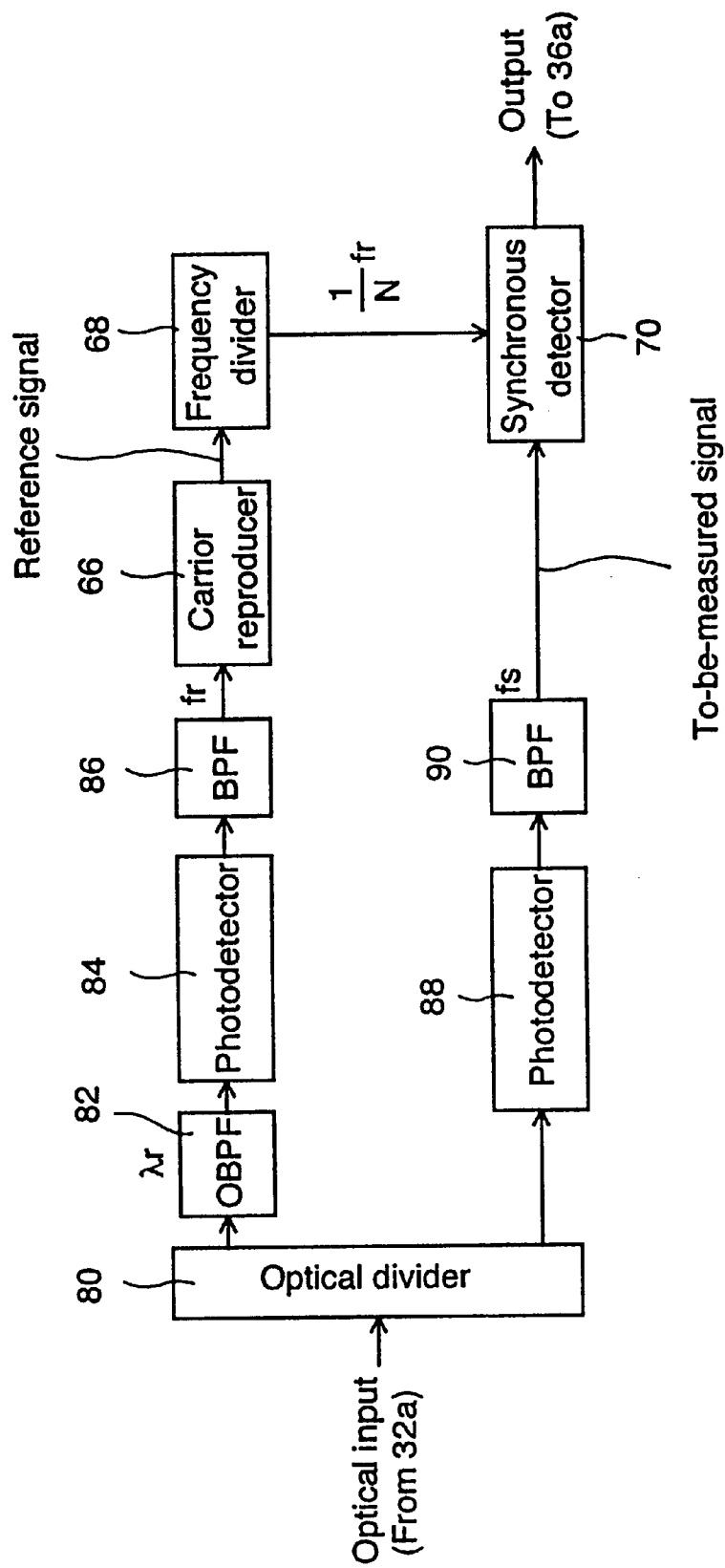

FIG. 6 is a block diagram schematically showing another construction partly modified from the circuit arrangement shown in FIG. 5 to reduce the jitter. The same circuit elements as those of FIG. 5 are labeled with common reference numerals. An optical divider 80 divides light from the divider 32a into two, and applies one to an optical band pass filter 82 configured to pass the component with the wavelength λr. The optical band pass filter 82 extracts only the component corresponding to the reference signal light with the wavelength λr output from the reference signal light generator 22, and applies it to a photodetector 84. The optical band pass filter 82 can extract only the reference signal light component exclusively. The photodetector 84 converts the output light from the optical band pass filter 82 into an electric signal, and outputs it in an amplified form into a predetermined level. The output of the photodetector 84 is applied to a band pass filter 86 whose center frequency is fr, and the band pass filter 86 extracts the component with the frequency fr, namely, the reference signal component, from the output of the photodetector 84. The output from the band pass filter 86 is applied to the carrier reproducing circuit 66.

The other divisional output light from the optical divider 80 is applied to a photodetector 88. The photodetector 88 converts the input light into an electric signal, and outputs it in an amplified form into a predetermined level. A band pass filter 90 whose center frequency is fs extracts the component with the measurement frequency fs (to-be-measured signal) from the output of the photodetector 88, and applies it to the synchronous detector 70.

Subsequent behaviors are the same as those of FIG. 5. That is, through the carrier reproducing circuit 66, frequency divider 68 and synchronous detector 70, the amplitude of the frequency fs component in the intensity fluctuation of the transmission signal light intensity-modulated by the tone signal with the measurement frequency fs is detected, and output from the synchronous detector 70 is applied to the modulator 36a as an output of the measuring circuit 34a.

In the construction of the measuring circuit 34a (34b) shown in FIG. 6, the transmission signal light component is not contained in the light entering into the photodetector 84. Therefore, a sufficiently high S/N ratio can be maintained in the process of reproducing the carrier wave of the tone signal with the reference frequency fr. As a result, the reference signal with less jitter can be obtained, and the detection sensitivity to the to-be-measured signal can be increased. Additionally, the S/N ratio can be made higher and higher as the pass bandwidth of the optical band pass filter 82 becomes narrower. However, it is necessary to ensure the stability of the center wavelength of the optical band pass filter 82 against changes in temperature. In contrast, even when the pass bandwidth of the optical band pass filter 82 is expanded to avoid instability to changes in temperature, the amount of transmission signal light passing through the optical band pass filter 82 does not increase even upon an increase in number of multiplexed wavelengths, and it never invites serious deterioration of the S/N ratio upon reproduction of the reference signal.

Figure 7:
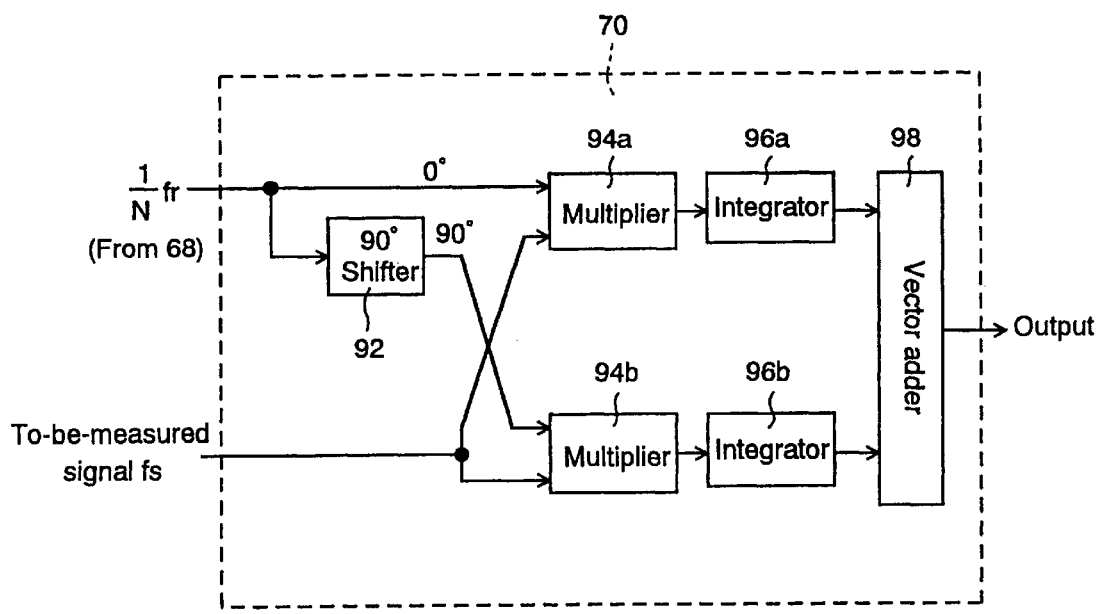
FIG. 7 is a block diagram schematically showing a construction of a synchronous detector 70.

FIG. 7 is a block diagram schematically showing the construction of the synchronous detector 70. The frequency divider 68 applies to the synchronous detector 70 the tone signal with the measurement frequency fs made by dividing the reference frequency fr into 1/N for both the phase 0 and the phase 90 (or −90). The synchronous detector 70 includes a 90 phase shifter 92, two multipliers 94a, 94b, two integrators 96a, 96b, and vector adder 98. Output from the frequency divider 68 is applied to an input of the multiplier 94a and to the phase shifter 92. The phase shifter 92 shifts the phase of the output from the frequency divider 68 by 90 (or −90), and applies it to an input of the multiplier 94b. The multiplier 94a multiplies the to-be-measured signal (output of the band pass filter 64) by the output (phase 0) of the frequency divider 68 whereas the multiplier 94b multiplies the to-be-measured signal (output from the band pass filter 64) by the output of the phase shifter 92 (signal made by phase-shifting the output of frequency divider 68 by 90). That is, the to-be-measured signal is orthogonally detected. Integrators 96a, 96b integrate respectively outputs of the multipliers 94a, 94b, that is, limit the band. The vector adder 98 makes addition of vectors of outputs from the integrators 96a, 96b. Output of the vector adder 98 is the output of the synchronous detector 70.

In the synchronous detector 70 relying on the above multiplying system, the amplitude of the reference signal to be multiplied with the to-be-measured signal must be constant because fluctuation in amplitude of the reference signal will results in changing the result of measurement. However, for the synchronous detection, there is known another system other than the above-explained system, in which the polarity of the signal is switched depending on the reference signal being 0 or 1, and this system does not require that the amplitude of the reference signal is constant. This system, for example, executes multiplication in the plus polarity when the reference signal is 0, and in the opposite polarity when the reference signal is 1. Although it results in doing the same processing as that of the circuit shown in FIG. 7, the amplitude of the reference signal need not be constant because a comparator is used to judge the reference signal.

The frequency divider 68 can be readily realized in form of a RC phase shifter or a digital circuit combining a flip-flop and a shift register. A self-multiplication of 2 is used as the ratio of frequency division, a digital frequency divider can be made more easily. In this case, since both the 0 component and 90 component can be obtained simultaneously, the function of the phase shifter 92 may be incorporated into the frequency divider 68.

In the embodiment shown in FIG. 1, the reference frequency fr is divided to obtain the measurement frequency fs. However, Needless to say, an oscillator of the measurement frequency fs may be used to obtain the reference frequency fr by multiplying its output.

Figure 8:
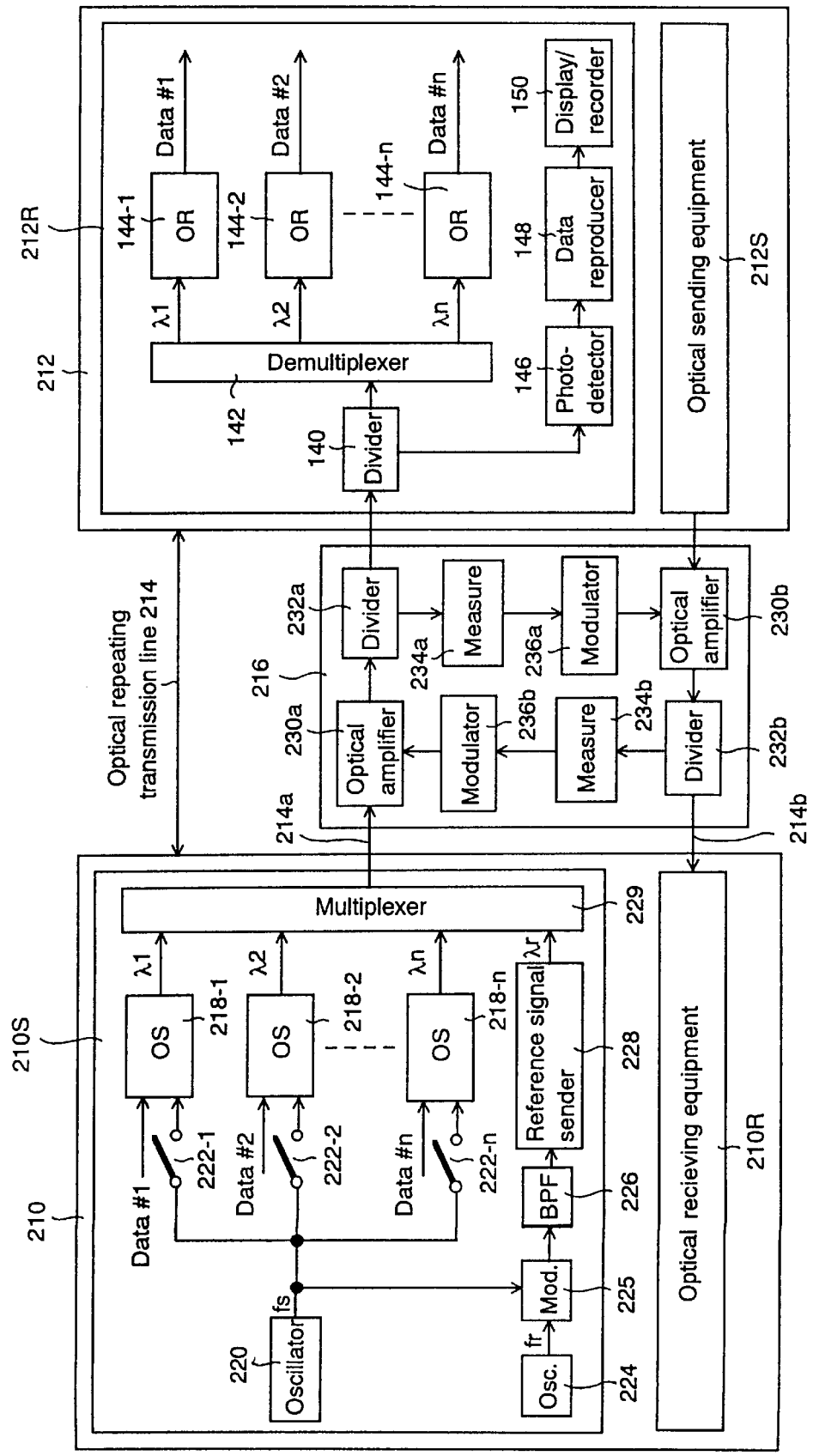
FIG. 8 is a block diagram showing a general construction according to a second embodiment of the invention.

The embodiment explained above is configured to easily obtain the measurement frequency fs from the reference signal light (frequency fr) in the measuring circuits 34a, 34b by maintaining a constant proportional relationship between the measurement frequency fs and the reference frequency fr. Even when the reference signal light with the wavelength λr different from wavelengths λ1 to λn of the signal light is modulated with the measurement frequency fs, the measurement frequency fs can be similarly sent to the repeater. FIG. 8 is a block diagram schematically showing the second embodiment having such a construction.

In a mode of modulation where modulation results in producing an optical intensity variable component of frequency fs, the optical intensity variable component of frequency fs inevitably mingles upon reception of light, and an optical filter will be necessary to remove it. However, When FM, PSK or other phase modulation system is used as the modulation system, the optical filter need not be used. As to amplitude modulation, the OOK system utilizing ON/OFF switching of light invites unstable changes in optical intensity and results in the frequency fs component directly mingling in the reference signal light, but so-called ASK and AM systems can prevent mixture of the frequency fs component because the part of "0" becomes CW light whereas the part of "1" becomes the frequency fr component, which results in maintaining the mean value of optical intensity components constant. Therefore, from the viewpoint of this embodiment, a frequency modulation system such as FSK, phase modulation system such as PSK or amplitude modulation system such as ASK can be used.

Explained below the construction of FIG. 8. Terminal stations 210, 212 have optical sending equipment 210S, 212S and optical receiving equipment 210R, 212R, respectively. Terminal stations 210 and 212 are connected by an optical repeating transmission line 214 including a pair of optical fiber transmission lines 214a and 214b. An optical signal output from the optical sending equipment 210S in the terminal station 210 travels through the optical fiber transmission line 214a and enters into the optical receiving equipment 212R in the terminal station 212. An optical signal output from the optical sending equipment 212S in the terminal station 212 travels through the optical fiber transmission line 214b and enters into the optical receiving equipment 210R in the terminal station 210. Typically, a plurality of optical repeaters 216 are provided on the optically repeating transmission line 214. FIG. 8, however, illustrates only one optical repeater 216 for simplicity.

Similarly to the conventional system and the embodiment shown in FIG. 1, the optical sending equipment 210S includes n pieces of optical transmission signal senders 218-1 through 218-n which respectively convert digital data #1 through #n into signal light with different wavelengths λ1 through λn. The optical sending equipment 210S further includes, as means for measuring optical power of the signal light with frequencies λ1 through λn, an oscillator 220 which oscillates at the measurement frequency fs of a value equivalent to that of the oscillator 122 in the conventional system, switches 222-1 through 222-n which selectively supplies the tone signal of the frequency fs output from the oscillator 220 to one of the optical transmission signal senders 218-1 to 218-n, oscillator 224 generating a tone signal of the frequency fr used as the carrier for transmitting the measurement frequency fs, modulator 225 for phase-modulating (PSK-modulating, for example) the output (frequency fr) of the oscillator 224 with the output (frequency fs) of the oscillator 220, band pass filter 226 for removing the frequency fs component from the output of the modulator 225, and reference signal light sender 228 for sending a reference signal light of wavelength λr made by deep optical intensity modulation with the output signal of the band pass filter 226.

Switches 222-1 to 222-n, which are similar to the switches 124-1 to 124-n in the conventional system and the switches 26-1 to 26-n in the embodiment shown in FIG. 1, are so configured that one of them is closed to pass the output of the oscillator 220 to one of the optical transmission signal senders 218-1 through 218-n. Similarly to the optical transmission signal senders 18-1 through 18-n and 118-1 through 118-n, one of the optical transmission signal senders 218-1 through 218-n, to which the tone signal of measurement frequency fs is applied, slightly intensity-modulate the optical transmission signal with the tone signal of frequency fs. The intensity modulation factor is set to a value low enough to prevent affection to the transmission characteristics of the optical transmission signal.

The modulator 225 modulates in phase the reference signal of the reference frequency fr output from the oscillator 224 with the tone signal of measurement frequency fs output from the oscillator 220. The band pass filter 226 extracts only the modulation signal component of the center frequency fr from the output of the modulator 225, and applies it to the reference signal light sender 228. The band pass filter 226 prevents the measurement signal fs component from being applied to the reference signal light sender 228. The reference signal light sender 228 issues a reference signal light made by intensity-modulating light of wavelength λr with the output of the band pass filter 226, namely, a signal made by modulating the tone signal of the reference frequency fr with the measurement frequency fs.

Figure 9:
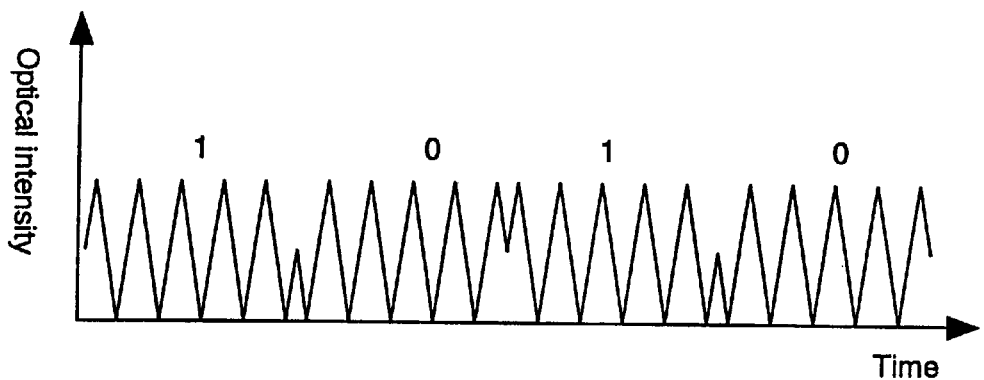
FIG. 9 is a time waveform diagram of output light from a reference signal light generator 228.
Figure 10:
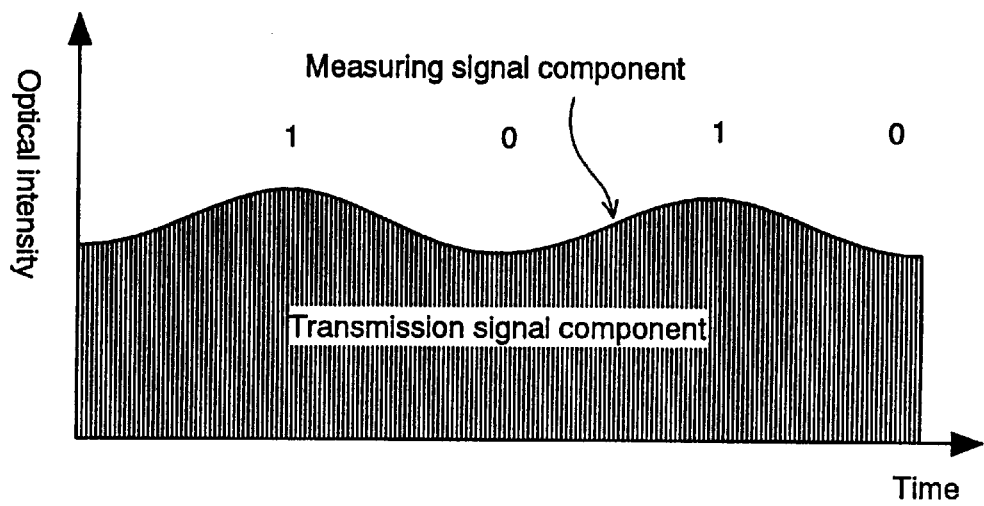
FIG. 10 is a time waveform diagram of transmission signal light modulated by the measurement frequency fs.

FIG. 9 shows a time waveform of output light from the reference signal light sender 228. FIG. 10 shows a time waveform of transmission signal light modulated with the measurement frequency fs. Both FIG. 9 and FIG. 10 show optical intensity on the ordinate and time on the abscissa. "1" and "0" attached on the waveform show an exemplary cycle of the measurement frequency fs.

A wavelength multiplexer 229 multiplexes the signal lights of wavelengths λ1 to λn output from the optical transmission signal senders 218-1 through 218-n and the reference signal light of the wavelength λr output from the reference signal light sender 228, and delivers it onto the optical fiber transmission line 214a.

Also the optical sending equipment 212S in the terminal station 212 have the same construction and behaves in the same manner as the optical sending equipment 210S in the terminal station 210.

In the optical repeater 216, optical amplifiers 230a, 230b optically amplify the optical signals (wavelength division multiplexed optical signals containing the signal lights with wavelengths λ1 to λn and reference signal light of wavelength λr) from the optical fiber transmission lines 214a, 214b, respectively. Dividers 232a, 232b output most of output light from the optical amplifiers 230a, 230b onto the optical fiber transmission lines 214a, 214b toward the terminal stations 212, 210 (or to a subsequent repeater), and apply small amounts of them to the measuring circuits 234a, 234b, respectively. The measuring circuit 234a, 234b demodulate the measurement frequency fs from the reference signal light of wavelength λr, and detect the frequency fs component from intensity fluctuation of the received light, using the demodulated signal. Measuring circuits 234a, 234b are explained later in greater detail. In this manner, in the optical sending equipment 210S, the output light component from an optical transmission signal sender 218-i (i=1~n) corresponding to a closed switch 222-i is extracted with a high S/N ratio, and the optical intensity (namely, the amplitude of the intensity component variable at frequency fs) can be measured. Modulators 236a, 236b, similarly to the modulators 36a, 36b, slightly modulate the amplification gains of the optical amplifiers 230b, 230a with reference to the digital data (or its coded data) resulting from measurement by the measuring circuits 234a, 234b.

Similarly to the conventional system and the embodiment shown in FIG. 1, results of measurement of optical powers of respective wavelengths are transmitted to the terminal stations 210, 212. That is, the optical signal from the terminal station 212 toward the terminal station 210 is intensity-modulated following to the result of measurement of optical power of a predetermined wavelength light in the wavelength division multiplexed light output from the terminal station 210, and the intensity-modulated optical signal is sent out onto the optical fiber transmission line 214b through the divider 232b and enters into the optical receiving equipment 210R in the terminal station 210. Similarly, the optical signal from the terminal station 210 toward the terminal station 212 is intensity-modulated following to the result of measurement of the optical power of a predetermined wavelength light in the wavelength division multiplexed light output from the terminal station 212, and the intensity-modulate optical signal is sent out onto the optical fiber transmission line 214a through the divider 232a and enters into the optical receiving equipment 212R in the terminal station 212.

Similarly to the embodiment shown in FIG. 1, the optical receiving equipment 212R in the terminal station 212 here again may have the same construction as that of the optical receiving equipment 112R used in the terminal station 112. Therefore, its elements common to those of the optical receiving equipment 112R are labeled with the same reference numerals.

Figure 11:
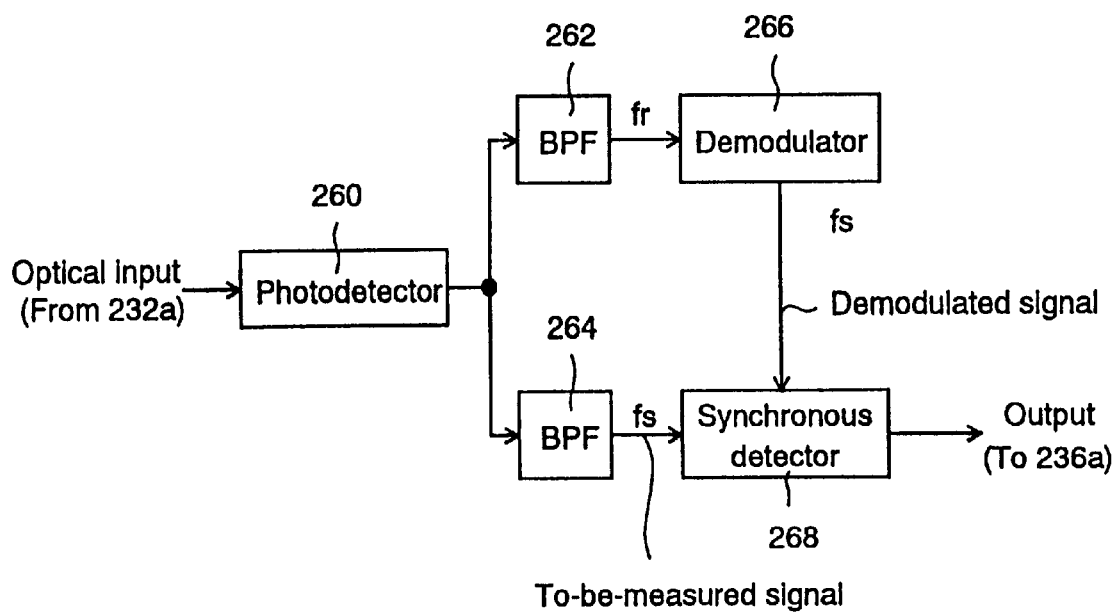

FIG. 11 is a block diagram schematically showing the construction of the measuring circuit 234a. Also the measuring circuit 234b has the same construction as that of the measuring circuit 234a. A photodetector 260 converts the light from the divider 232a (wavelength division multiplexed light with wavelengths λ1 to λn and λr) into an electric signal, and outputs it in an amplified form into a predetermined level. output from the photodetector 260 is applied to a band pass filter 262 of center frequency fr and to a band pass filter 264 of center frequency fs. The band pass filter 262 extracts the frequency fr component, and the band pass filter 264 extracts the frequency fs component.

Output from the band pass filter 262 is applied to a demodulator 266. The demodulator 266 demodulates the output of the band pass filter 262. output from the demodulator 266 corresponds to the modulation signal to be applied to a modulator 225, namely, the output of the oscillator 220. The demodulator 266 can be made of a phase locked loop (PLL) circuit in the FM or FSK system, and an error signal to the voltage controlled oscillator (VCO) is taken as the demodulation output. In case of the PM or PSK system, the demodulator circuit 266 can be realized in form of a Costas loop using PLL. This is a widely known demodulation system, and not explained here. The AM and ASK demodulation systems detection and synchronous detection using PLL.

The detector 268 synchronously detects the output of the band pass filter 264 with the demodulation output of the demodulator 266. Output from the synchronous detector 268 is applied to a modulator 236a as an output of the measuring circuit 234a. Similarly to the embodiment shown in FIG. 1, the measure level of the tone signal of frequency fs superposed on the transmission signal light is transmitted to the terminal stations 210, 212 as information indicating the data of measured optical power of the wavelength light.

Figure 12:
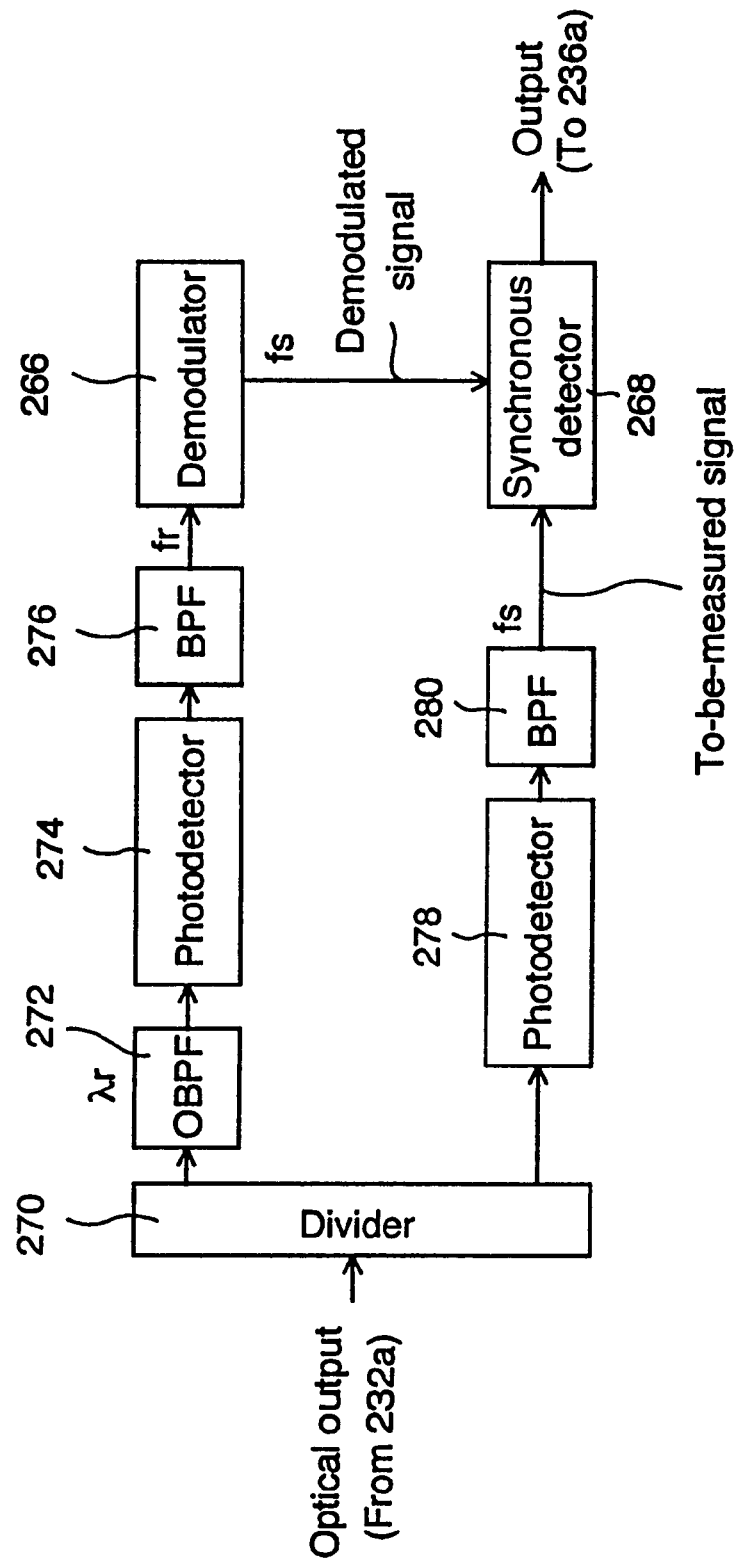
Figure 13:
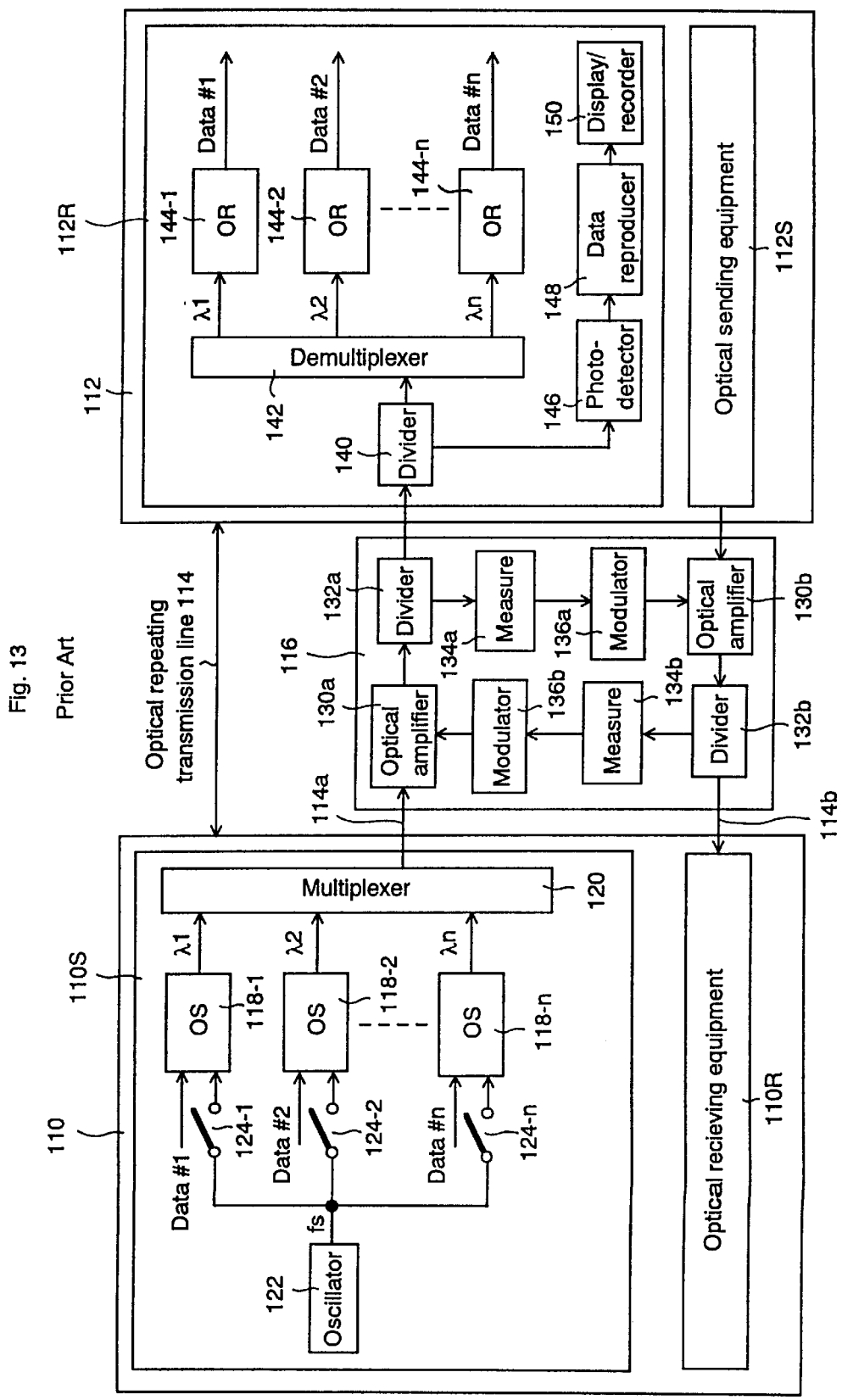
FIG. 13 is a block diagram showing a general construction of a prior art.
Figure 14:
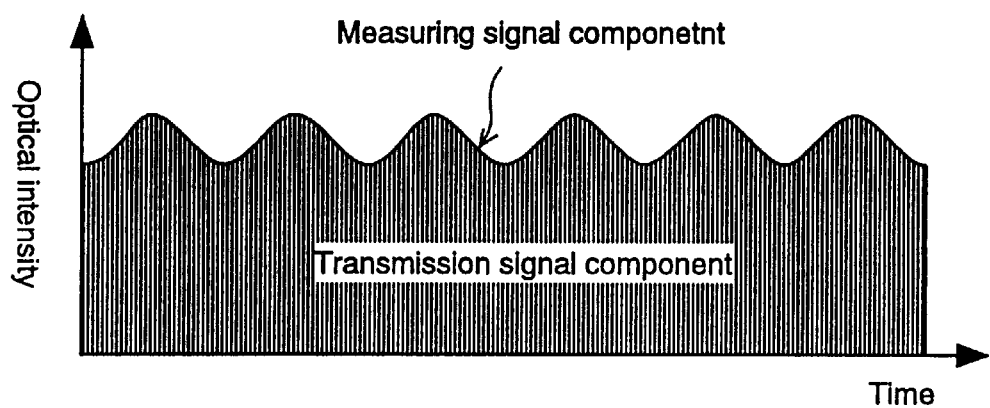
FIG. 14 is a time waveform diagram of an optical transmission signal intensity-modulated by a sinusoidal output of an oscillator 122.
Figure 15:
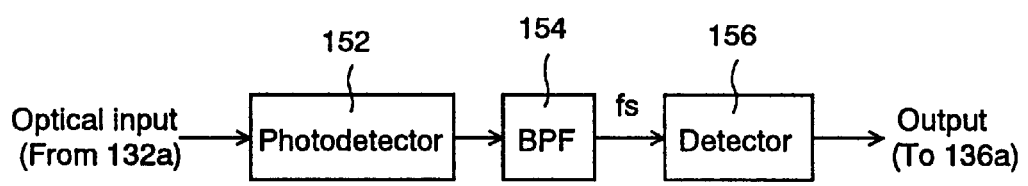
Figure 16:
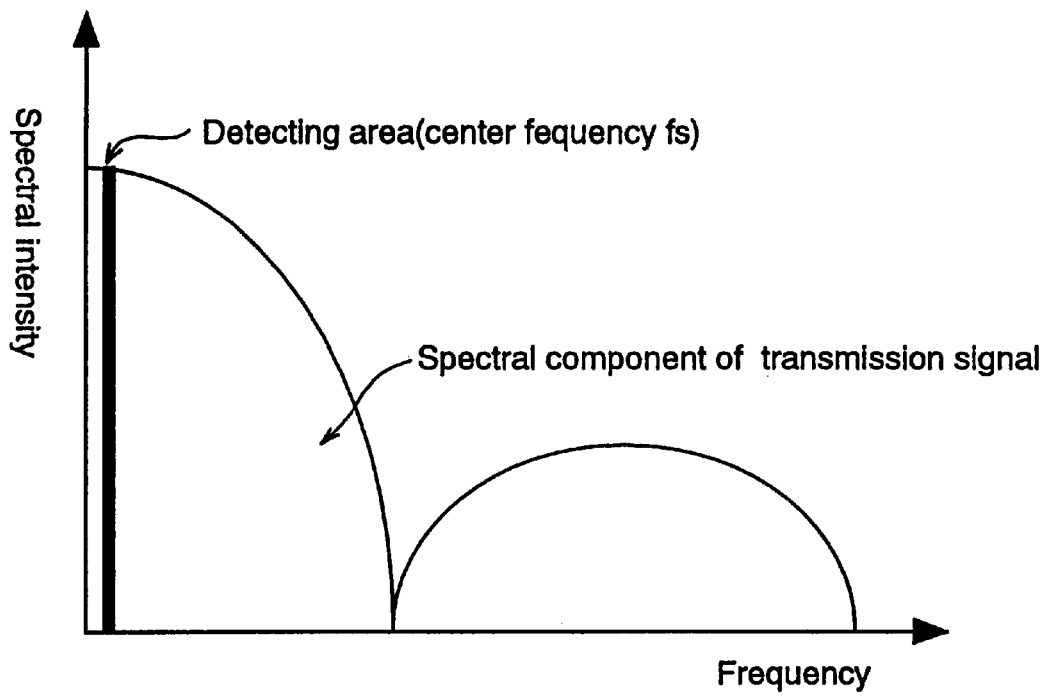
FIG. 16 is a diagram of power spectral distribution of output from a photodetector 152.
Figure 17:
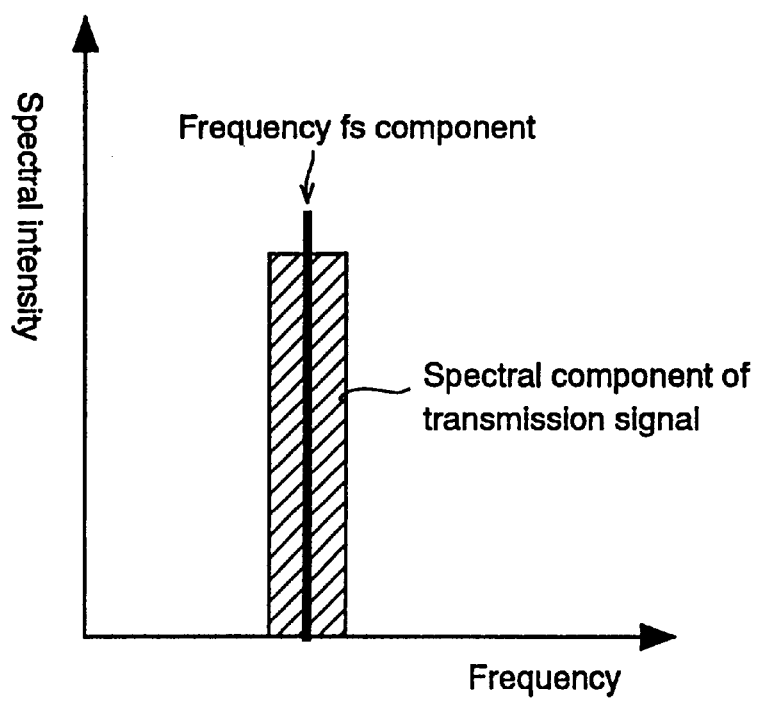
FIG. 17 is a diagram showing spectral distribution of output from a band pass filter 154.

FIG. 12 shows a circuit arrangement of the measuring circuit 234a modified from the arrangement of the measuring circuit 134a shown in FIG. 11 to reduce the jitter in the same sense as the modification of FIG. 6 relative to the measuring circuit 34a shown in FIG. 5. Elements common to those of FIG. 11 are labeled with the same reference numerals. An optical divider 270 divides the light from the divider 232a into two, and applies one to an optical band pass filter 272 passing only the wavelength λr component. An optical band pass filter 272 extracts only the component corresponding to the reference signal light of wavelength λr output from the reference signal sender 228, and applies it to a photodetector 274. Only the reference signal light component can be extracted, exclusively, by using the optical band pass filter 272. The photodetector 274 converts the output light from the optical band pass filter 272 into an electric signal, and outputs it in an amplified form into a predetermined level. Output from the photodetector 274 is applied to a band pass filter 276 of center frequency fr, and the band pass filter 276 extracts the frequency fr component, namely the reference signal component, from the output of the photodetector 274. Output from the band pass filter 276 is applied to the demodulator circuit 266.

The other divisional output light from the optical divider 270 is applied to a photodetector 278. The photodetector 278 converts the input light into an electric signal, and outputs it in an amplified form into a predetermined level. A band pass filter 280 of center frequency fs extracts the frequency fs component (to-be-measured signal) from the output of the photodetector 278, and applies it to the synchronous detector 268.

Subsequent behaviors of the circuit shown here are the same as those of FIG. 11. That is, the amplitude of the frequency fs component with the intensity of the transmission signal light intensity-modulated by the tone signal of frequency fs is detected by the demodulator 266 and the synchronous detector 268. output from the synchronous detector circuit 268 is applied to the modulator 236a as an output from the measuring 234a.

Since the circuit arrangement of the measuring circuit 234a shown in FIG. 12 is configured to obtain the reference signal (signal modulated by the measurement frequency fs) from the optical signal not containing the transmission optical signal component, similarly to the arrangement of the measuring circuit 34a shown in FIG. 6, it can obtain the frequency fs signal synchronizing the to-be-measured signal with a high S/N ratio, and can therefore reduce the jitter. The narrower the pass bandwidth of the optical band pass filter 272, the higher the S/N ratio obtained. However, it is necessary to stabilize the center wavelength of the optical band pass filter 272 against changes in temperature. In contrast, even when the pass bandwidth of the optical band pass filter 272 is expanded to avoid instability due to changes in temperature, it does not invite serious deterioration of the S/N ratio in the output of the photodetector 274 because the amount of the transmission signal light passing through the optical band pass filter 272 does not necessarily increase with the increase of the number of wavelengths to be multiplexed.

Thus, those skilled in the art will readily understand that the invention ensures precise detection of power of each wavelength light in a wavelength-division multiplexed signal under the data transmission condition and that the S/N ratio for power detection can be increased so much to extend the minimum measurable power to remarkably lower values than those conventional systems could detect.

We claim:

1. An optical power measuring system configured to send out selected one of a plurality of optical transmission signals having different wavelengths $\lambda 1$ through $\lambda n$ in a slightly intensity-modulated form with a measurement frequency fs onto an optically repeating transmission line and to measure optical power thereof in a particular repeater on the optical repeating transmission line, comprising:

a tone signal generator for generating tone signals having a reference frequency fr and the measurement frequency fs which synchronize in phase;

a reference signal light sender for sending reference signal light intensity-modulated by said reference frequency fr generated in said tone signal generator, the reference signal light having a wavelength $\lambda r$ different from the wavelengths $\lambda 1$ through $\lambda n$ of said optical transmission signals;

a switching apparatus for selectively applying the tone signal of the measurement frequency fs generated by said tone signal generator to one of a plurality of optical transmission signal sender configured to output optical transmission signals with different wavelengths $\lambda 1$ through $\lambda n$;

a wavelength multiplexer for wavelength-multiplexing said optical transmission signals and the reference signal light output from said reference signal light sender and for outputting thus multiplexed signal onto said optical repeating transmission line;

a divider in said particular repeater for dividing input light and for sending out one divisional optical output to a subsequent optical repeating transmission line;

a measuring circuit in said particular repeater for reproducing a reference signal of said reference frequency fr and a to-be-measured signal having said measurement frequency fs and for measuring the optical power of said to-be-measured signal in accordance with a signal with a frequency corresponding to said measurement frequency fs obtained from said reference signal; and a signal transmitter in said particular repeater for transmitting a result of measurement by said measuring circuit to a predetermined station.

2. The optical power measuring system according to claim 1 wherein said tone signal generator includes an oscillator for oscillating at one of said reference frequency fr and said measurement frequency fs, and a frequency converter for converting an output from said oscillator into the other of said reference frequency fr and said measurement frequency fs.

3. The optical power measuring system according to claim 2 wherein said measuring circuit includes:

a photodetector for converting the other divisional output of said divider into an electric signal;

a first filter for extracting the reference signal component of said reference frequency fr from an output of said photodetector;

a carrier reproducer for reproducing the reference signal of said reference frequency fr from an output of said first filter;

a frequency divider for frequency-dividing output from said carrier reproducer and for generating a signal with the same frequency as said measurement frequency fs;

a second filter for extracting the to-be-measured signal component of said measurement frequency fs from an output of said photodetector; and a synchronous detector for synchronously detecting the output of said second filter in accordance with the output from said frequency divider.

4. The optical power measuring system according to claim 2 wherein said measuring circuit includes:

an optical divider for dividing the other divisional output from said divider into two;

an optical filter for extracting the wavelength $\lambda r$ component from one divisional optical output from said optical divider;

a first photodetector for converting output light from said optical filter into an electric signal;

a first filter for extracting the reference signal component of said reference frequency fr from an output of said first photodetector;

a carrier reproducer for reproducing the reference signal of said reference frequency fr from an output of said first filter;

a frequency divider for frequency-dividing the output from said carrier reproducer and for generating a signal with the same frequency as said measurement frequency fs;

a second photodetector for converting the other divisional optical output from said optical divider into an electric signal;

a second filter for extracting the to-be-measured signal component of said measurement frequency fs from an output of said second photodetector; and a synchronous detector for synchronously detecting an output from said second filter in accordance with an output from said frequency divider.

5. An optical power measuring system configured to send out selected one of a plurality of optical transmission signals having different wavelengths $\lambda 1$ through $\lambda n$ in form of a slightly intensity-modulated form by a measurement frequency fs onto an optical repeating transmission line and to measure the optical power thereof in a particular repeater on said optical repeating transmission line, comprising:

a first oscillator for oscillating at said measurement frequency fs;

a second oscillator for oscillating at a reference frequency fr;

a modulator for modulating an output from said second oscillator with an output from said first oscillator;

a filter for removing the measurement frequency component from an output of said modulator;

a reference signal light sender for generating reference signal light intensity-modulated with an output from said filter, the reference signal light having a wavelength $\lambda r$ different from said wavelengths $\lambda 1$ through $\lambda n$ of said optical transmission signals;

a switching apparatus for selectively applying the output from said first oscillator to selected one of a plurality of optical transmission signal senders configured to output optical transmission signals with different wavelengths $\lambda 1$ through $\lambda n$;

a wavelength multiplexer for wavelength-multiplexing said optical transmission signals and the reference signal light output from said reference signal light sender and for sending thus multiplexed light out onto said optical repeating transmission line;

a divider in said particular repeater for dividing input light and for sending out one to a subsequent optical repeating transmission line;

a measuring circuit in said particular repeater for reproducing a component of said reference frequency fr and a to-be-measured signal component of said measurement frequency fs from the other divisional output of said divider and for measuring the optical powder of said to-be-measured signal in accordance with a signal with a frequency corresponding to said measurement frequency fs obtained from said reference signal; and a signal transmitter in said particular repeater for transmitting the result of measurement by said measuring circuit to a predetermined station.

6. The optical power measuring system according to claim 5 wherein said measuring circuit includes:

a photodetector for converting the other divisional output from said divider into an electric signal;

a first filter for extracting a frequency component of said reference frequency fr from an output of said photodetector;

a demodulator for demodulating an output of said first filter and for outputting a frequency signal corresponding to said measurement frequency fs;

a second filter for extracting the to-be-measured signal component of said measurement frequency fs from the output of said photodetector; and a synchronous detector for synchronously detecting an output from said second filter in accordance with an output from said demodulator.

7. The optical power measuring system according to claim 5 wherein said measuring circuit includes:

an optical divider for dividing the other divisional output from said divider into two;

an optical filter for extracting a wavelength $\lambda r$ component from one divisional optical output of said optical divider;

a first photodetector for converting output light from said optical filter into an electric signal;

a first filter for extracting a frequency component with said reference frequency fr from an output of said first photodetector;

a demodulator for demodulating an output from said first filter and for outputting a frequency signal corresponding to said measurement frequency fs;

a second photodetector for converting the other divisional optical output of said optical divider into an electric signal;

a second filter for extracting a to-be-measured signal component with said measurement frequency fs from an output of said second photodetector; and a synchronous detector for synchronously detecting an output from said second filter in accordance with an output from said demodulator.

8. A terminal station connected to another station by a first optical repeating transmission line for transmitting an optical signal in a first direction and a second optical repeating transmission line for transmitting an optical signal in a second direction opposite from said first direction, and having optical sending equipment and optical receiving equipment, said optical sending equipment including:

a tone signal generator for generating tone signals having a reference frequency fr and a measurement frequency fs which are synchronous in phase;

a reference signal light sender for sending reference signal light which is deeply intensity-modulated with the tone signal of the reference frequency fr generated by said tone signal generator, the reference signal having a wavelength $\lambda r$ different from wavelengths $\lambda 1$ through $\lambda n$ of optical transmission signals;

a switching apparatus for selectively applying the tone signal of said measurement frequency fs output from said tone signal generator to selected one of a plurality of optical transmission signal senders configured to output optical transmission signals with different wavelengths $\lambda 1$ through $\lambda n$; and a wavelength multiplexer for wavelength-multiplexing said optical transmission signals and the reference signal light output from said reference signal light sender and for sending out thus multiplexed light onto said first optical repeating transmission line, and said optical receiving equipment including:

a data restorer for wavelength-dividing optical transmission signals having different wavelengths from said another station, from input light introduced from said second optical repeating transmission line, and for restoring respective data;

a data reproducer for reproducing information on optical power measured in said repeater from the input light introduced from said second optical repeating transmission line; and a display/recorder for displaying and/or recording an output from said data reproducer.

9. The terminal station according to claim 8 wherein said tone signal generator includes an oscillator for oscillating at one of said reference frequency fr and said measurement frequency fs; and a frequency converter for converting an output from said oscillator into the other of said reference frequency fr and said measurement frequency fs.

10. A terminal station connected to another station by a first optical repeating transmission line for transmitting an optical signal in a first direction and a second optical repeating transmission line for transmitting an optical signal in a second direction opposite from said first direction, and having optical sending equipment and optical receiving equipment, said optical sending equipment including:

a first oscillator for oscillating at said measurement frequency fs;

a second oscillator for oscillating at a reference frequency fr;

a modulator for modulating an output from said second oscillator with an output from said first oscillator;

a filter for removing the measurement frequency component from an output of said modulator;

a reference signal light sender for sending reference signal light intensity-modulated with an output from said filter, the reference signal having a wavelength $\lambda r$ different from said wavelengths λ1 through λn of said optical transmission signals;

a switching apparatus for selectively applying the output from said first oscillator to selected one of a plurality of optical transmission signal senders configured to output optical transmission signals with different wavelengths λ1 through λn;

a wavelength multiplexer for wavelength-multiplexing said optical transmission signals and the reference signal light output from said reference signal sender and for sending thus multiplexed light out onto said optical repeating transmission line, and said optical receiving equipment including:

a data restorer for wavelength-dividing optical transmission signals having different wavelengths from said another station, from input light introduced from said second optical repeating transmission line, and for restoring respective data;

a data reproducer for reproducing information on optical power measured in said repeater from the input light introduced from said second optical repeating transmission line; and a display/recorder for displaying and/or recording an output from said data reproducer.

11. A repeater comprising:

an optical amplifier for optically amplifying an input light, said input light comprising a plurality of optical transmission signals having different signal wavelengths λ1 through λn including arbitrary one slightly intensity-modulated with a measurement frequency fs, and reference signal light intensity-modulated with a reference signal carrying frequency and phase information of the measurement frequency fs and having a wavelength λr different from said signal wavelengths λ1 through λn;

a divider for dividing output light from said optical amplifier and for sending out one divisional optical output to a subsequent optical repeating transmission line;

a measuring circuit for reproducing said reference signal and a to-be-measured signal having said measurement frequency fs from the other divisional optical output from said divider and for measuring the optical power of said to-be-measured signal according to the frequency and phase information of said measurement frequency fs obtained from said reference signal; and a signal transmitter for transmitting the result of measurement by said measuring circuit by superposing it on an optical signal toward a sender of said optical transmission signals.

12. The repeater according to claim 11 wherein said reference signal is a tone signal having a reference frequency fr corresponding to N times the measurement frequency fs, and said measuring circuit includes:

a photodetector for converting the other divisional output from said divider into an electric signal;

a first filter for extracting the reference signal component having said reference frequency fr from an output of said photodetector;

a carrier reproducer for reproducing a reference signal having said reference frequency from an output of said first filter;

a frequency divider for frequency-dividing an output of said carrier reproducer and for generating a signal having the same frequency as said measurement frequency fs;

a second filter for extracting a to-be-measured signal component having said measurement frequency fs from an output of said photodetector; and a synchronous detector for synchronously detecting the output of said second filter in accordance with an output from said frequency divider.

13. The repeater according to claim 11 wherein said reference signal is a tone signal having a reference frequency fr corresponding to N times said measurement frequency fs, and said measuring circuit includes:

an optical divider for dividing the other divisional output of said divider into two;

an optical filter for extracting the wavelength λr component from one divisional optical output from said optical divider;

a first photodetector for converting output light of said optical filter into an electric signal;

a carrier reproducer for reproducing a reference signal having said reference frequency from an output of said first filter;

a frequency divider for frequency-dividing an output from said carrier reproducer and for generating a signal having the same frequency as said measurement frequency fs;

a second photodetector for converting the other divisional optical output of said optical divider;

a second filter for extracting the to-be-measured signal component having said measurement frequency fs from an output of said second photodetector; and a synchronous detector for synchronously detecting the output of said second filter in response to an output from said frequency divider.

14. The repeater according to claim 11 wherein said reference signal is prepared by modulating a tone signal having a reference frequency fr higher than said measurement frequency fs with said measurement frequency fs, and said measuring circuit includes:

a photodetector for converting the other divisional output of said divider into an electric signal;

a first filter for extracting a frequency component having said reference frequency fr from an output of said photodetector;

a demodulator for demodulating the output of said first filter and for outputting a frequency signal corresponding to said measurement frequency fs;

a second filter for extracting the to-be-measured signal component having said measurement frequency fs from the output of said photodetector; and a synchronous detector for synchronously detecting the output of said second filter in response to an output from said demodulator.

15. The repeater according to claim 11 wherein said reference signal is prepared by modulating a tone signal having a reference frequency fr higher than said measurement frequency fs with said measurement frequency fs, and said measuring means includes:

an optical divider for dividing the other divisional optical output from said divider into two;

an optical filter for extracting a component having a wavelength λr from one divisional optical output of said optical divider;

a first photodetector for converting output light from said optical filter into an electric signal;

a first filter for extracting a frequency component having said reference frequency fr from an output of said first photodetector;

a demodulator for demodulating an output of said first filter and for outputting a frequency signal corresponding to said measurement frequency fs;

a second photodetector for converting output light from the other divisional optical output of the optical divider into an electric signal;

a second filter for extracting the to-be-measured signal component having said measurement frequency fs from an output of said second photodetector; and a synchronous detector for synchronously detecting the output of said second filter in response to an output from said demodulator.

16. An optical power measuring system configured to selectively send out onto an optical repeating transmission line one of a plurality of optical transmission signals having different wavelengths $\lambda 1$ through $\lambda n$ after slightly intensity-modulating it with a measurement frequency fs and to send out onto said optical repeating transmission line reference signal light intensity-modulated with a reference signal carrying a frequency and phase information of said measurement frequency fs, the reference signal light having a wavelength $\lambda r$ different from said wavelengths $\lambda 1$ through $\lambda n$ of said signals, so as to measure the optical power in a particular repeater on said optical repeating transmission line, characterized in that said repeater includes:

a measuring circuit for reproducing said reference signal and a to-be-measured signal having said measurement frequency fs from input light and for measuring the optical power of said to-be-measured signal in accordance with the frequency and phase information of said measurement frequency fs obtained from said reference signal; and a signal transmitter for transmitting the result of measurement by said measuring circuit by superposing it on an optical signal toward a sender of said optical transmission signals.

17. The optical power measuring system according to claim 16 wherein said reference signal is a tone signal having a reference frequency fr N times said measuring frequency fs.

18. The optical power measuring system according to claim 16 wherein said reference signal is made by modulating a tone signal having a reference frequency fr higher than said measurement frequency fs with said measuring frequency fs.

19. An optical power measuring system for sending a selected one of a plurality of optical transmission signals having different wavelengths $\lambda 1$ through n intensity-modulated with a measurement frequency fs onto an optically repeating transmission line and measuring optical power thereof in a repeater on the optical repeating transmission line, comprising:

a tone signal generator for generating tone signals having a reference frequency fr and the measurement frequency fs which are synchronize in phase;

a reference signal light sender for sending reference signal light intensity-modulated by said reference frequency fr generated in said tone signal generator, the reference signal light having a wavelength $\lambda r$ different from the wavelengths $\lambda 1$ through $\lambda n$ of said optical transmission signals;

a plurality of optical transmission signal senders each outputting a different one of the optical transmission signals;

a switching apparatus for selectively applying the tone signal of the measurement frequency fs generated by said tone signal generator to one of the optical transmission signal senders;

a wavelength multiplexer for wavelength-multiplexing said optical transmission signals and the reference signal light output from said reference signal light sender and for outputting such multiplexed signal onto said optical repeating transmission line;

a divider in said repeater for dividing input light into two divisional optical outputs, and for sending one of said divisional optical outputs to a subsequent optical repeating transmission line;

a measuring circuit in said repeater for reproducing, from the other divisional optical output of said divider, a reference signal having said reference frequency fr and a to-be-measured signal having said measurement frequency fs, and for measuring the optical power of said to-be-measured signal in accordance with a signal with a frequency corresponding to said measurement frequency fs obtained from said reference signal; and a signal transmitter in said repeater for transmitting a result of the measurement by said measuring circuit to a predetermined station.

20. The optical power measuring system according to claim 19 wherein said tone signal generator includes an oscillator having one of said reference frequency fr and said measurement frequency fs, and a frequency converter for converting an output from said oscillator into the other one of said reference frequency fr and said measurement frequency fs.

21. The optical power measuring system according to claim 20 wherein said measuring circuit includes:

a photodetector for converting the other divisional output of said divider into an electric signal;

a first filter for extracting the reference signal from an output of said photodetector;

a carrier reproducer for reproducing the reference signal from an output of said first filter;

a frequency divider for frequency-dividing an output from said carrier reproducer and generating a signal with the same frequency as said measurement frequency fs;

a second filter for extracting the to-be-measured signal from the output of said photodetector; and a synchronous detector for synchronously detecting an output of said second filter in accordance with an output from said frequency divider.

22. The optical power measuring system according to claim 20 wherein said measuring circuit includes:

an optical divider for dividing the other divisional output from said divider into two divisional optical outputs;

an optical filter for extracting the wavelength $\lambda r$ component from one divisional optical output from said optical divider;

a first photodetector for converting output light from said optical filter into an electric signal;

a first filter for extracting the reference signal from an output of said first photodetector;

a carrier reproducer for reproducing the reference signal from an output of said first filter;

a frequency divider for frequency-dividing the output from said carrier reproducer and generating a signal with the same frequency as said measurement frequency fs;

a second photodetector for converting the other divisional optical output from said optical divider into an electric signal;

a second filter for extracting the to-be-measured signal from an output of said second photodetector; and a synchronous detector for synchronously detecting an output from said second filter in accordance with an output from said frequency divider.

23. An optical power measuring system for sending a selected one of a plurality of optical transmission signals having different wavelengths $\lambda 1$ through $\lambda n$ intensity-modulated by a measurement frequency fs onto an optical repeating transmission line and to measure the optical power thereof in a repeater on said optical repeating transmission line, comprising:

a first oscillator for oscillating at said measurement frequency fs;

a second oscillator for oscillating at a reference frequency fr;

a modulator for modulating an output from said second oscillator with an output from said first oscillator;

a filter for removing the measurement frequency component from an output of said modulator;

a reference signal light sender for generating intensity-modulated reference signal light from an output from said filter, the reference signal light having a wavelength $\lambda r$ different from said wavelengths $\lambda 1$ through $\lambda n$ of said optical transmission signals;

a plurality of optical transmission signals senders each outputting a different one of the optical transmission signals;

a switching apparatus for selectively applying the output from said first oscillator to a selected one of the optical transmission signal senders;

a wavelength multiplexer for wavelength-multiplexing said optical transmission signals and the reference signal light output from said reference signal light sender and for sending such multiplexed light onto said optical repeating transmission line;

a divider in said repeater for dividing input light into two divisional optical outputs and for sending one of said divisional optical outputs to a subsequent optical repeating transmission line;

a measuring circuit in said repeater for reproducing, from the other divisional optical output of said divider, a reference signal having said reference frequency fr and a to-be-measured signal having said measurement frequency fs, and for measuring the optical power of said to-be-measured signal in accordance with a signal with a frequency corresponding to said measurement frequency fs obtained from said reference signal; and a signal transmitter in said repeater for transmitting the result of measurement by said measuring circuit to a predetermined station.

24. The optical power measuring system according to claim 23 wherein said measuring circuit includes:

a photodetector for converting the other divisional output from said divider into an electric signal;

a first filter for extracting said reference frequency fr from an output of said photodetector;

a demodulator for demodulating an output of said first filter and for outputting a frequency signal corresponding to said measurement frequency fs;

a second filter for extracting the to-be-measured signal from the output of said photodetector; and a synchronous detector for synchronously detecting an output from said second filter in accordance with an output from said demodulator.

25. The optical power measuring system according to claim 23 wherein said measuring circuit includes:

an optical divider for dividing the other divisional output from said divider into two divisional optical outputs;

an optical filter for extracting a wavelength $\lambda r$ component from one divisional optical output of said optical divider;

a first photodetector for converting output light from said optical filter into an electric signal;

a first filter for extracting said reference frequency fr from an output of said first photodetector;

a demodulator for demodulating an output from said first filter and outputting a frequency signal corresponding to said measurement frequency fs;

a second photodetector for converting the other divisional optical output of said optical divider into an electric signal;

a second filter for extracting the to-be-measured signal from an output of said second photodetector; and a synchronous detector for synchronously detecting an output from said second filter in accordance with an output from said demodulator.

26. A terminal station connected to another station by a first optical repeating transmission line for transmitting light comprising one of a plurality of optical transmission signals having different wavelengths $\lambda 1$ through $\lambda n$ in a first direction and a second optical repeating transmission line for transmitting light comprising one of a plurality of optical transmission signals having different wavelengths in a second direction opposite from said first direction, and having optical sending equipment and optical receiving equipment, said optical sending equipment including:

a tone signal generator for generating tone signals having a reference frequency fr and a measurement frequency fs which are synchronous in phase;

a reference signal light sender for sending reference signal light intensity-modulated with the tone signal of the reference frequency fr generated by said tone signal generator, the reference signal having a wavelength $\lambda r$ different from wavelengths $\lambda 1$ through $\lambda n$ of the optical transmission signals;

a plurality of optical transmission signal senders each outputting a different one of the optical transmission signals;

a switching apparatus for selectively applying the tone signal of said measurement frequency fs output from said tone signal generator to a selected one of the optical transmission signal senders;

a wavelength multiplexer for wavelength-multiplexing said optical transmission signals and the reference signal light output from said reference signal light sender and for sending such multiplexed light onto said first optical repeating transmission line; and said optical receiving equipment including:

a data restorer for wavelength-dividing the light introduced from said second optical repeating transmission line, and for restoring data from said light;

a data reproducer for reproducing information on optical power measured in a repeater from the restored data; and a display/recorder for displaying or recording an output from said data reproducer.

27. The terminal station according to claim 26 wherein said tone signal generator includes an oscillator having one of said reference frequency fr and said measurement frequency fs, and a frequency converter for converting an output from said oscillator into the other one of said reference frequency fr and said measurement frequency fs.

28. A terminal station connected to another station by a first optical repeating transmission line for transmitting light comprising one of a plurality of optical signals having different wavelengths λ1 through λn in a first direction and a second optical repeating transmission line for transmitting light comprising optical signals having different wavelengths in a second direction opposite from said first direction, and having optical sending equipment and optical receiving equipment, said optical sending equipment including:
- a first oscillator for oscillating at said measurement frequency fs;
- a second oscillator for oscillating at a reference frequency fr;
- a modulator for modulating an output from said second oscillator with an output from said first oscillator;
- a filter for removing the measurement frequency component from an output of said modulator;
- a reference signal light sender for sending reference signal light intensity-modulated with an output from said filter, the reference signal having a wavelength λr different from said wavelengths λ1 through λn of said optical signals;
- a plurality of optical transmission signal senders each outputting a different one of the optical signals;
- a switching apparatus for selectively applying the output from said first oscillator to a selected one of the optical transmission signal senders;
- a wavelength multiplexer for wavelength-multiplexing said optical signals and the reference signal light output from said reference signal sender and for sending such multiplexed light onto said first optical repeating transmission line, and said optical receiving equipment including:
  - a data restorer for wavelength-dividing the optical signals from said another station from the light introduced from said second optical repeating transmission line, and for restoring data from said light;
  - a data reproducer for reproducing information on optical power measured in a repeater from the data; and
  - a display/recorder for displaying or recording an output from said data reproducer.

29. A repeater, comprising:
- an optical amplifier for optically amplifying input light, said input light comprising a plurality of optical transmission signals each having different signal wavelengths λ1 through λn, one of said optical transmission signals being intensity-modulated with a measurement frequency fs, and a reference signal light intensity-modulated with a reference signal carrying frequency and phase information of the measurement frequency fs and having a wavelength λr different from said signal wavelengths λ1 through λn;
- a divider for dividing output light from said optical amplifier into two divisional optical outputs, and for sending one of said divisional optical outputs to a subsequent optical repeating transmission line;
- a measuring circuit for reproducing, from the other divisional optical output from said divider, said reference signal and a to-be-measured signal having said measurement frequency fs and for measuring the optical power of said-to-be-measured signal according to the frequency and phase information of said measurement frequency fs obtained from said reference signal; and
- a signal transmitter for transmitting the result of the measurement by said measuring circuit by superposing it on an optical signal toward a sender of said optical transmission signals.

30. The repeater according to claim 29 wherein said reference signal is a tone signal having a reference frequency fr corresponding to N times the measurement frequency fs, and said measuring circuit includes:
- a photodetector for converting the other divisional output from said divider into an electric signal;
- a first filter for extracting the reference signal from an output of said photodetector;
- a carrier reproducer for reproducing the reference signal from an output of said first filter;
- a frequency divider for frequency-dividing an output of said carrier reproducer and generating a signal having the same frequency as said measurement frequency fs;
- a second filter for extracting the to-be-measured signal from the output of said photodetector; and
- a synchronous detector for synchronously detecting an output of said second filter in accordance with an output from said frequency divider.

31. The repeater according to claim 29 wherein said reference signal is a tone signal having a reference frequency fr corresponding to N times said measurement frequency fs, and said measuring circuit includes:
- an optical divider for dividing the other divisional output of said divider into two divisional optical outputs;
- an optical filter for extracting the wavelength λr component from one divisional optical output from said optical divider;
- a first photodetector for converting output light of said optical filter into an electric signal;
- a carrier reproducer for reproducing the reference signal from an output of said first filter;
- a frequency divider for frequency-dividing an output from said carrier reproducer and generating a signal having the same frequency as said measurement frequency fs;
- a second photodetector for converting the other divisional optical output of said optical divider;
- a second filter for extracting the to-be-measured signal from an output of said second photodetector; and
- a synchronous detector for synchronously detecting an output of said second filter in response to an output from said frequency divider.

32. The repeater according to claim 29 wherein said reference signal is generated by modulating a tone signal, having a reference frequency fr higher than said measurement frequency fs, with said measurement frequency fs, and said measuring circuit includes:
- a photodetector for converting the other divisional output of said divider into an electric signal;
- a first filter for extracting a frequency component having said reference frequency fr from an output of said photodetector;
- a demodulator for demodulating an output of said first filter and outputting a frequency signal corresponding to said measurement frequency fs;
- a second filter for extracting the to-be-measured signal from the output of said photodetector; and
- a synchronous detector for synchronously detecting an output of said second filter in response to an output from said demodulator.

33. The repeater according to claim 29 wherein said reference signal is generated by modulating a tone signal having a reference frequency fr, higher than said measurement frequency fs, with said measurement frequency fs, and said measuring means includes:

- an optical divider for dividing the other divisional optical output from said divider into two divisional optical outputs;
- an optical filter for extracting a component having a wavelength $\lambda r$ from one divisional optical output of said optical divider;
- a first photodetector for converting output light from said optical filter into an electric signal;
- a first filter for extracting a frequency component having said reference frequency fr from an output of said first photodetector;
- a demodulator for demodulating an output of said first filter and outputting a frequency signal corresponding to said measurement frequency fs;
- a second photodetector for converting output light from the other divisional optical output of the optical divider into an electric signal;
- a second filter for extracting the to-be-measured signal from an output of said second photodetector; and
- a synchronous detector for synchronously detecting an output of said second filter in response to an output from said demodulator.

34. An optical power measuring system for sending onto an optical repeating transmission line one of a plurality of optical transmission signals each having different wavelengths $\lambda 1$ through $\lambda n$ after intensity-modulating it with a measurement frequency fs and further sending onto said optical repeating transmission line a reference signal light intensity-modulated with a reference signal carrying frequency and phase information of said measurement frequency fs, the reference signal light having a wavelength $\lambda r$ different from said wavelengths $\lambda 1$ through $\lambda n$ of said optical transmission signals, so as to measure the optical power in a repeater on said optical repeating transmission line, said repeater comprising:

- a measuring circuit for reproducing said reference signal and a to-be-measured signal having said measurement frequency fs from input light and for measuring the optical power of said to-be-measured signal in accordance with the frequency and phase information of said measurement frequency fs obtained from said reference signal; and
- a signal transmitter for transmitting the result of the measurement by said measuring circuit by superposing it on an optical signal toward a sender of said optical transmission signals.

35. The optical power measuring system according to claim 34 wherein said reference signal is a tone signal having a reference frequency fr N times said measuring frequency fs.

36. The optical power measuring system according to claim 34 wherein said reference signal is generated by modulating a tone signal having a reference frequency fr, higher than said measurement frequency fs, with said measuring frequency fs.

* * * * *